US009152890B2

United States Patent
Ukishima et al.

(10) Patent No.: US 9,152,890 B2
(45) Date of Patent: Oct. 6, 2015

(54) IMAGE RECORDING METHOD AND APPARATUS, AND RECORDING MEDIUM

(71) Applicant: FUJIFILM Corporation, Tokyo (JP)

(72) Inventors: Masayuki Ukishima, Kanagawa (JP); Masashi Ueshima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/316,247

(22) Filed: Jun. 26, 2014

(65) Prior Publication Data

US 2015/0002907 A1     Jan. 1, 2015

(30) Foreign Application Priority Data

Jun. 28, 2013    (JP) ................................ 2013-137274

(51) Int. Cl.
| | |
|---|---|
| *G06K 15/02* | (2006.01) |
| *H04N 1/60* | (2006.01) |
| *G06K 15/10* | (2006.01) |
| *H04N 1/40* | (2006.01) |

(52) U.S. Cl.
CPC ............ *G06K 15/027* (2013.01); *G06K 15/102* (2013.01); *G06K 15/1868* (2013.01); *H04N 1/6097* (2013.01)

(58) Field of Classification Search
USPC ...................... 358/3.24, 1.9, 518, 504; 347/19
See application file for complete search history.

(56) References Cited

U.S. PATENT DOCUMENTS

| | | |
|---|---|---|
| 2003/0164955 A1 | 9/2003 | Vinas et al. |
| 2008/0204816 A1 | 8/2008 | Miyazaki |
| 2010/0220365 A1* | 9/2010 | Sasayama ...................... 358/448 |
| 2011/0227988 A1* | 9/2011 | Yamazaki ........................ 347/19 |

FOREIGN PATENT DOCUMENTS

| | | |
|---|---|---|
| EP | 1182047 A1 | 2/2002 |
| JP | 2006-276166 A | 10/2006 |
| JP | 2010-082989 A | 4/2010 |

OTHER PUBLICATIONS

The extended European search report issued by the European Patent Office on Nov. 19, 2014, which corresponds to European Patent Application No. 14174713.9-1806 and is related to U.S. Appl. No. 14/316,247.
An Office Action; "Notification of Reasons for Rejection," issued by the Japanese Patent Office on May 11, 2015, which corresponds to Japanese Patent Application No. 2013-137274 and is related to U.S. Appl. No. 14/316,247; with English language partial translation.

* cited by examiner

*Primary Examiner* — Quang N Vo
(74) *Attorney, Agent, or Firm* — Studebaker & Brackett PC

(57) ABSTRACT

The present invention provides an image recording method and apparatus and a recording medium therefor. In an aspect of the present invention, when recording the image in a condition where an image recording range in a first direction by the image recorder is a specific range, image processing is applied to the image data using a latest image processing parameter among image processing parameters which are according to positions in the first direction and have been generated on the basis of measurement results of test charts output using the specific range or a wider range than the specific range on the image recorder, and the image recorder is caused to record the image on the recording medium according to the image data after the image processing.

12 Claims, 23 Drawing Sheets

FIG.9

| SHEET WIDTH | APPLIED NOZZLE RANGE | CORRECTION PARAMETERS | UPDATED DATE AND TIME (YEAR/MONTH/DAY_TIME: MINUTE) |
|---|---|---|---|
| S1 | Xa1 ~ xb1 | LUT_1 | 2013/06/05_13:20 |
| S2 | Xa2 ~ xb2 | LUT_2 | 2013/06/10_08:45 |
| S3 | Xa3 ~ xb3 | LUT_3 | 2013/06/11_14:12 |
| S4 | Xa4 ~ xb4 | LUT_4=LUT_3 | 2013/06/11_14:12 |
| | | | |
| Sn | Xan ~ xbn | LUT_n=LUT_3 | 2013/06/11_14:12 |

FIG.12

| SHEET WIDTH | APPLIED NOZZLE RANGE | CORRECTION PARAMETERS | UPDATED DATE AND TIME (YEAR/MONTH/DAY_TIME: MINUTE) |
|---|---|---|---|
| S1 | xa1 ~ xb1 | LUT_1 | 2013/06/05_13:20 |
| S2 | Xa2 ~ xb2 | LUT_2 | 2013/06/10_08:45 |
| S3 | Xa3 ~ xb3 | LUT_3 | 2013/06/11_14:12 |
| S4 | Xa4 ~ xb4 | - | - |
| Sn | Xan ~ xbn | - | - |

FIG.15

| SHEET WIDTH | APPLIED NOZZLE RANGE | CORRECTION PARAMETERS | UPDATED DATE AND TIME (YEAR/MONTH/DAY_TIME: MINUTE) |
|---|---|---|---|
| S1 | xa1 ~ xb1 | LUT_1 | 2013/06/05_13:20 |
| S2 | xa2 ~ xb2 | LUT_2 | 2013/06/10_08:45 |
| S3 | xa3 ~ xb3 | LUT_3 | 2013/06/11_14:12 |
| S4 | xa4 ~ xb4 | LUT_4 | 2013/05/26_09:30 |
| | | | |
| Sn | xan ~ xbn | LUT_n | YYYY/MM/DD_hh:mm |

FIG.16

| MEDIUM TYPE | INK TYPE | QUANTIZATION METHOD | SHEET WIDTH | APPLIED NOZZLE RANGE | CORRECTION PARAMETERS | UPDATED DATE AND TIME (YEAR/MONTH/DAY_TIME: MINUTE) |
|---|---|---|---|---|---|---|
| M_1 | INK_1 | HT_1 | S1 | xa1 ~ xb1 | LUT_1 | 2013/06/05_13:20 |
| | | | S2 | xa2 ~ xb2 | LUT_2 | 2013/06/10_08:45 |
| | | | S3 | xa3 ~ xb3 | LUT_3 | 2013/06/11_14:12 |
| | | | Sn | xan ~ xbn | LUT_n | YYYY/MM/DD_hh:mm |

451 452 454
453
460A

460B

IMAGE RECORDING METHOD AND APPARATUS, AND RECORDING MEDIUM

CROSS-REFERENCE TO RELATED APPLICATIONS

The patent application claims priority under 35 U.S.C. §119 to Japanese Patent Application No. 2013-137274, filed on Jun. 28, 2013. Each of the above application(s) is hereby expressly incorporated by reference, in its entirety, into the present application.

BACKGROUND OF THE INVENTION

1. Field of the Invention

The present invention relates to an image recording method and apparatus and a recording medium, and in particular to a technique of managing parameters used for image processing during image recording on a recording medium based on image data.

2. Description of the Related Art

An inkjet printer, which is a form of an image recording apparatus, includes a recording head provided with a plurality of ink ejection ports (nozzles), and records an image on a recording medium by controlling an operation of ejecting ink from each of nozzles on the basis of image data as a print object. Each of the nozzles on the recording head varies in recording characteristics (ink ejection characteristics). If an image is formed without addressing the variation, various head characteristics, such as variation in the amount of ejected ink, variation in ink deposition position, and variation in ink concentration between the nozzles, are affected, thereby causing concentration unevenness in an image of a printed matter.

Accordingly, in general, a conventional inkjet printer includes a processing system (concentration unevenness correcting process system) for correcting concentration unevenness to prevent concentration unevenness from occurring. Use of this concentration unevenness correcting process system generates a concentration unevenness correction parameter, which is a concentration unevenness correction value, and performs an image data converting process to which the concentration unevenness correction parameter is applied.

As techniques of correcting concentration unevenness, various methods have been proposed, including, for instance, a method described in Japanese Patent Application Laid-Open No. 2010-082989. An overview of the technique of correcting concentration unevenness disclosed in Japanese Patent Application Laid-Open No. 2010-082989 is as follows. First, a test chart for measuring concentration for acquiring a concentration converting function for correcting concentration unevenness is output. An image of the output test chart for measuring concentration is read. A recorded concentration is measured. A signal converting function (concentration converting function) for image data is generated for each nozzle on the basis of the measured concentration data. When an image is printed, input image data is corrected on the basis of the concentration converting function, and image recording is controlled on the basis of the corrected image data, thereby forming an image where concentration unevenness is prevented from occurring.

SUMMARY OF THE INVENTION

As with the concentration converting function in the technique of correcting concentration unevenness described in Japanese Patent Application Laid-Open No. 2010-082989, concentration unevenness correction parameters for a single-path inkjet printer are set according to the position in medium width direction (defined as an "x direction") orthogonal to a conveyance direction (defined as a "y direction") of a recording medium. One of methods of defining an image position in the x direction is, for instance, on the position of a nozzle corresponding to the image position in the x direction. A concentration unevenness correction parameter can be created for each nozzle in a group of nozzles in a recording head that is used for forming a test pattern for measuring concentrations. Accordingly, a recording medium having a medium size as large as possible is used for creating concentration unevenness correction parameters. It is preferred that the test pattern be printed using nozzles as many as possible in the recording head to acquire concentration unevenness correction parameters for the nozzles as many as possible.

However, it is assumed that recording media having various sizes be used when a user uses an inkjet printer. If a test chart for measuring concentration is output using a recording medium having a size smaller than the maximum usable size for a printing system to create concentration unevenness correction parameters on the basis of the read result of the test chart, concentration unevenness correction parameters can be acquired only for nozzles in a nozzle range printable on a medium-sized recording medium used for outputting the test chart.

Accordingly, if the user tries printing on a recording medium having a larger size, there is a possibility that appropriate image quality over the entire print screen cannot be achieved without performing a process of generating concentration unevenness correction parameter afresh on a recording medium having a size used for the printing or a recording medium having a larger size. Such necessity of performing the process afresh of generating concentration unevenness correction parameters for each of sizes of recording media used for printing results in increase in load on the user.

Even if the printing system has preliminarily performed a process of creating concentration unevenness correction parameters for a recording medium having the maximum usable size, a process of creating concentration unevenness correction parameters through use of a recording medium having a smaller size unfortunately updates parameters only for some of nozzles in the nozzle array in the recording head. Thus, an unnatural parameter gap possibly occurs at a boundary between updated nozzles and non-updated nozzles. Such parameter discontinuity possibly reduces output image quality.

Meanwhile, management of concentration correction parameters separately for medium sizes requires processes of creating concentration unevenness correction parameters as many times as the number of types of medium sizes to be used. This requirement possibly increases the load on the user.

In the case where a printing system always compulsorily requires a process of creating concentration unevenness correction parameters through use of a recording medium having the maximum usable size, a recording medium having the maximum size is necessarily prepared and an operation of replacing recording media is necessarily performed. These necessities, again, increase the load on the user.

The foregoing problems are not limited to inkjet printing systems but are common to image recording apparatuses adopting various drawing schemes. These problems are not limited to concentration correction parameters but are common to various image processing parameters according to image positions.

The present invention has been made in view of such situations. It is an object of the present invention to provide an image recording method and apparatus and a recording medium that can solve at least one of the foregoing problems and record an image using appropriate image processing parameters without increasing the load on a user.

In order to achieve the object, the following aspects of the invention are provided.

(First Aspect): An image recording method of causing an image recorder to record an image on a recording medium on the basis of image data, includes: when recording the image in a condition where an image recording range in a first direction by the image recorder is a specific range, applying image processing to the image data using a latest image processing parameter among image processing parameters which are according to positions in the first direction and have been generated on the basis of measurement results of test charts output using the specific range or a wider range than the specific range on the image recorder; and causing the image recorder to record the image on the recording medium according to the image data after the image processing.

The first aspect can appropriately manage the image processing parameter to be updated in the condition with the image recording range different in the first direction, and record the image using the appropriate image processing parameter suitable for the condition in the image recording range for recording the image.

(Second Aspect): The image recording method according to the first aspect can further include, when generating the latest image processing parameter, specifying an image processing parameter generated on the basis of a measurement result of a test chart output using a narrower range than the specific range before a timing of generating the latest image processing parameter, not to be used, after the timing of generating the latest image processing parameter.

For a narrower range than the specific range, the image processing parameter created in the specific range can be used.

(Third Aspect): The image recording method according to first or second aspect can further include: when recording the image using the specific range of the image recorder on a recording medium with a medium size in the first direction which is a specific size, applying image processing on the image data using the latest image processing parameter among image processing parameters which are according to positions in the first direction and have been generated on the basis of measurement results of test charts recorded on recording media having a size identical to the specific size or a larger size than the specific size; and recording the image on the recording medium with the specific size according to the image data after the image processing.

Change in the medium size of the recording medium to be used, in turn, changes the image recording range by the image recorder. Accordingly, the condition of the medium size can be associated with the condition of the image recording range. Accordingly, the image recording range can be grasped using the medium size as an indicator.

(Fourth Aspect): The image recording method according to the third aspect can further include: when generating the latest image processing parameter, specifying an image processing parameter generated on the basis of a measurement result of a test chart recorded on a recording medium with a smaller size than the specific size before a timing of generating the latest image processing parameter, not to be used, after the timing of generating the latest image processing parameter.

(Fifth Aspect): The image recording method according to any one of the first to fourth aspects can further include managing the image processing parameter for each of print conditions different in at least one of a medium type, an ink type, and a quantization method.

Change in the print condition other than the image recording range causes a possibility of changing the most appropriate image processing parameter. Accordingly, it is preferred to manage the image processing parameter for each print condition.

(Sixth Aspect): The image recording method according to any one of the first to fifth aspects can adopt a configuration where the image recorder is a recording head which includes a recording element array including a plurality of recording elements arranged at different positions in the first direction, and the image is recorded on the recording medium by controlling an operation of the recording element according to the image data after the image processing, and conveying the recording medium in a second direction orthogonal to the first direction with respect to the recording head.

In the case of using the line head, the first direction may be the longitudinal direction of the line head orthogonal to the medium conveyance direction (second direction).

(Seventh Aspect): An image recording apparatus according to a seventh aspect includes: an image recorder which records an image on a recording medium on the basis of image data; an image processing parameter storage which stores an image processing parameter according to a position in a first direction for the image recorder; a parameter manager which manages storing of the image processing parameter into the image processing parameter storage, and reading of the image processing parameter from the image processing parameter storage; an image processor which performs image processing on the image data using the image processing parameter; and a controller which, when the image is recorded in a condition where an image recording range in the first direction by the image recorder is a specific range, performs image processing for the image data using the latest image processing parameter among image processing parameters which are according to positions in the first direction and have been generated on the basis of output results of test charts recorded using the specific range or a wider range than the specific range of the image recorder, and causes the image recorder to record the image on the recording medium according to processed image data acquired by the image processing using the specific range of the image recorder.

(Eighth Aspect): The image recording apparatus according to the seventh aspect can adopt a configuration where the parameter manager associates the image processing parameter with information identifying the image recording range which is in the first direction and which is used for outputting the test chart when the image processing parameter is generated, and with updated date and time of the image processing parameter, and manages the parameter.

(Ninth Aspect): The image recording apparatus according to the seventh or eighth aspect can adopt a configuration where when generating the latest image processing parameter, the parameter manager specifies an image processing parameter generated on the basis of a measurement result of a test chart output using a narrower range than the specific range before a timing of generating the latest image processing parameter, not to be used, after the timing of generating the latest image processing parameter.

(Tenth Aspect): The image recording apparatus according any one of the seventh to ninth aspects can adopt a configuration where the image processing parameter is stored in the image processing parameter storage in association with at least one combination of print conditions of a medium type, an ink type, and a quantization method.

(Eleventh Aspect): The image recording apparatus according to any one of the seventh to tenth aspects can adopt a configuration where the image recorder is a recording head which includes a recording element array including a plurality of recording elements arranged on different positions in the first direction, and the image is recorded on the recording medium by controlling an operation of the recording element according to image data after the image processing and conveying the recording medium in a second direction orthogonal to the first direction with respect to the recording head.

(Twelfth Aspect): Computer-readable code of a program is stored in a non-transitory recording medium according to a twelfth aspect, and the program causes a computer to achieve a function of controlling an image recording apparatus of causing an image recorder to record an image on a recording medium on the basis of image data, wherein when recording the image in a condition where an image recording range in a first direction by the image recorder is a specific range, the program causes the computer to achieve an image processing function of applying image processing to the image data using a latest image processing parameter among image processing parameters which are according to positions in the first direction and have been generated on the basis of measurement results of test charts output using the specific range or a wider range than the specific range on the image recorder, and a control function of causing the image recorder to record the image on the recording medium according to the image data after application of the image processing.

In the program stored in the recording medium according to the twelfth aspect, the pieces of content of the first to sixth aspects can be appropriately combined.

The present invention can appropriately manage the image processing parameter to be updated according to the condition of the different image recording range, and record an image using the image processing parameter suitable for the image recording range used during image recording. Thus, the load on the user is reduced, and favorable printing without failure can be executed.

BRIEF DESCRIPTION OF THE DRAWINGS

FIG. 9 is a schematic diagram of data stored in a concentration unevenness correction parameter storage in the case of updating parameters according to the flow of FIG. 8;

FIG. 12 is a schematic diagram of data stored in the concentration unevenness correction parameter storage in the case of updating parameters according to the flow of FIG. 11;

FIG. 15 is a schematic diagram of data stored in the concentration unevenness correction parameter storage in the case of updating parameters according to the flow of FIG. 14;

FIG. 16 is a diagram illustrating an example of managing correction parameters for each combination of print conditions other than the medium size;

DETAILED DESCRIPTION OF THE PREFERRED EMBODIMENTS

Embodiments of the present invention are hereinafter described in detail with reference to the accompanying diagrams.

First Embodiment

Configuration of Printing System

Figure 1:
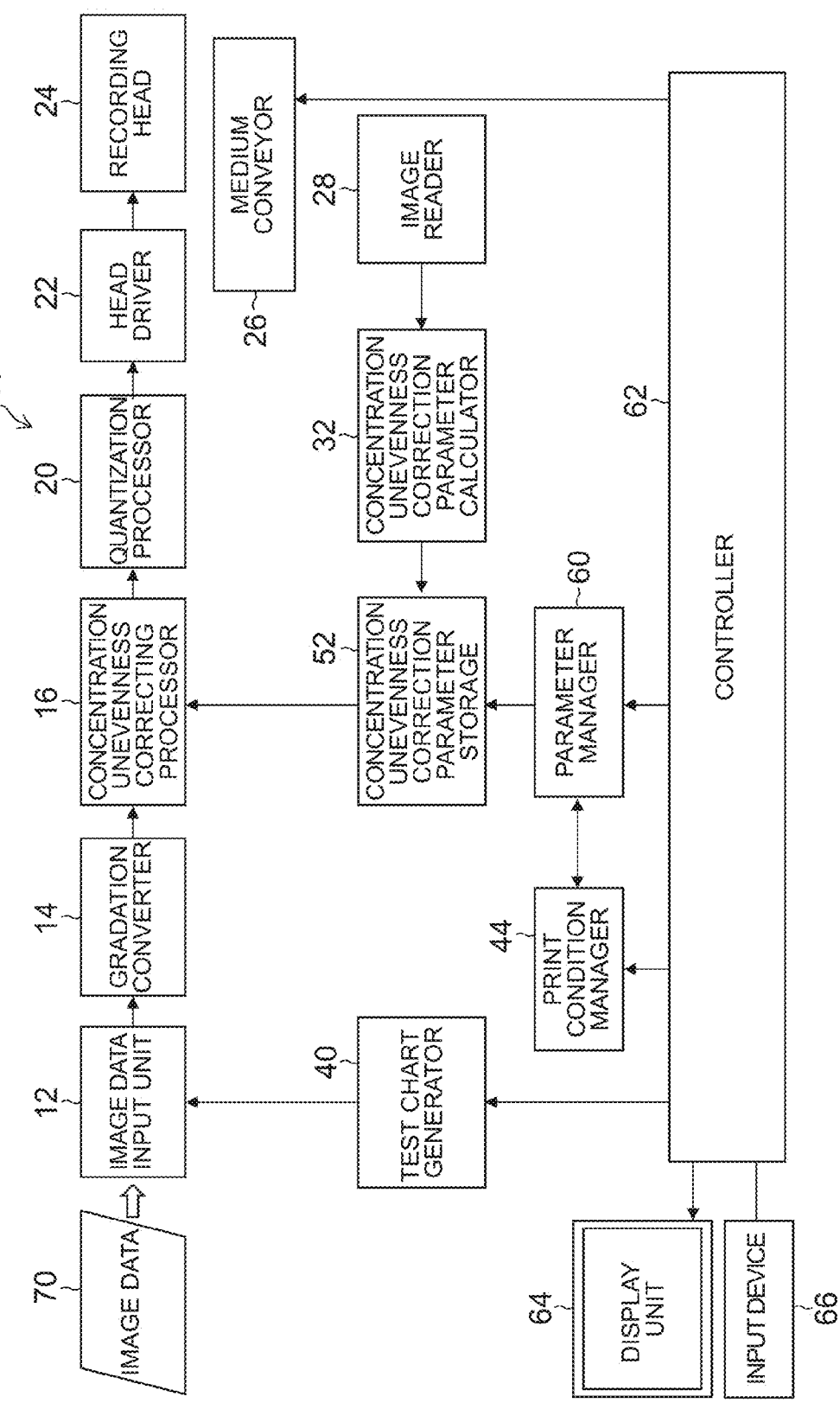
FIG. 1 is a block diagram showing an example of a configuration of a printing system according to a first embodiment of the present invention.

FIG. 1 is a block diagram showing an example of a configuration of a printing system according to a first embodiment of the present invention. The printing system 10 (corresponding to an "image recording apparatus"), which is a single-path inkjet printing system, includes an image data input unit 12, a gradation converter 14, a concentration unevenness correcting processor 16, a quantization processor 20, a head driver 22, and a recording head 24 (corresponding to an "image recorder"). The printing system 10 includes a medium conveyor 26 that conveys a recording medium (not shown in FIG. 1), an image reader 28 that reads an image recorded on the recording medium by the recording head 24, a concentration unevenness correction parameter calculator 32 that analyzes a read image acquired from the image reader 28 to calculate concentration unevenness correction parameters, and a concentration unevenness correction parameter storage 52 (corresponding to an "image processing parameter storage") that stores the calculated concentration unevenness correction parameter.

Furthermore, the printing system 10 includes a test chart generator 40 that generates data of various test charts including a test chart for measuring concentration, a print condition manager 44 that manages print conditions required for executing a print job, a parameter manager 60 that manages image processing parameters, and a controller 62 that controls the entire system. A display unit 64 and an input device 66 are connected to the controller 62. The controller 62 includes a calendar time function (a date and time information generator, not shown) that generates information on date and time.

The display unit 64 and the input device 66 function as user interfaces (UIs). The input device 66 may be various devices, such as a keyboard, a mouse, a touch panel and a trackball, or an appropriate combination thereof. In this example, a combination of a touch panel, a keyboard and a mouse is adopted as the input device 66. As with a configuration where a touch panel is arranged on the screen of the display unit 64, a configuration may be adopted that integrally includes the display unit 64 and the input device 66.

An operator can input various pieces of information, such as input of print conditions, selection of an image quality mode, input and editing of appended information, and information search, through use of the input device 66 while viewing content displayed on the screen of the display unit 64. Through the input, the operator can thus operate the printing system 10. Various pieces of information including input content and the like can be verified through displayed content on the display unit 64. Through the display unit 64, the states of the system and the like can be grasped (verified).

Each of the concentration unevenness correction parameter calculator 32, the concentration unevenness correction parameter storage 52, the test chart generator 40, the print condition manager 44, the parameter manager 60, the controller 62, the display unit 64 and the input device 66 that are shown in FIG. 1 can be achieved by adopting a combination of hardware and software of a computer that are used as a printer control apparatus.

Each of the image data input unit 12, the gradation converter 14, the concentration unevenness correcting processor 16, the quantization processor 20 and the head driver 22 may be mounted as an image processing function in an inkjet recording apparatus (printer). The entire or some of the image processors (12 to 22) may be mounted in a control apparatus.

<<On Recording Head>>

The recording head 24 is a line head including a nozzle array in which multiple nozzles (ink ejection ports) arranged along the length corresponding to the entire width (the maximum width of an image formation region) of a drawing region in the medium width direction orthogonal to the conveyance direction of a recording medium. The medium conveyance direction through the medium conveyor 26 corresponds to a "second direction", and is referred to as a "sub-scanning direction" or a "y direction". The medium width direction orthogonal to the medium conveyance direction corresponds to a "first direction", and referred to as a "main scanning direction" or an "x direction".

For the sake of simplicity of illustration, FIG. 1 shows only one block for the recording head 24. However, a printing system for forming a color image includes multiple recording heads corresponding to respective colors of multiple ink colors. This example describes the case of adopting inks of four colors, or cyan (C), magenta (M), yellow (Y) and black (K), and including recording heads for ejecting the respective color inks. Note that the number of ink colors and the combination thereof are not limited to this example. For instance, an embodiment where inks of light colors, such as light cyan (LC) and light magenta (LM), are added in addition to the four CMYK colors, and an embodiment of adopting inks of special colors, such as red and green, may also be adopted.

The detailed structure of the recording head 24 is not shown. However, inkjet recording head 24 includes an ejection energy generation element (e.g., a piezoelectric element or a heat generating element) that generates ejection energy required to eject ink for each nozzle. The recording head 24 ejects ink droplets on demand according to a drive signal and an ejection control signal that are supplied from the head driver 22.

The number of nozzles, the nozzle density, and the nozzle arrangement form of the recording head 24 are not specifically limited. Various forms can be adopted. For instance, in order to achieve a prescribed recording resolution in the main scanning direction, a one-dimensional nozzle array where many nozzle arranged linearly (on one line) at constant intervals may be adopted. Alternatively, what is called a staggered arrangement may be adopted where two nozzle arrays are arranged to deviate in the nozzle array direction from each other by ½ pitch of the nozzle interval (inter-nozzle pitch) in each nozzle array. In order to achieve a much higher recording resolution, configurations where many nozzles are two-dimensionally arranged on an ink ejection surface (nozzle surface) may be adopted, for instance, including a matrix arrangement where at least three nozzle arrays are arranged and the like.

In the case of an inkjet head including a two-dimensional nozzle array, a projected nozzle array, which is projection (orthogonal projection) of nozzles which are in the two-dimensional nozzle array and arranged in a medium width direction (corresponding to the main scanning direction), can be regarded equivalent to a nozzle array which is in one line and has a nozzle density of achieving a recording resolution in the main scanning direction (medium width direction) and in which nozzles are arranged at substantially regular intervals. The "regular intervals" described here mean that deposition points recordable by the inkjet printing system are substantially at regular intervals. For instance, the concept of "regular intervals" includes the case of including nozzles whose intervals are slightly varied in consideration of manufacturing error and shift of droplets on a medium due to deposition interference. In consideration of a projected nozzle array (also referred to as a "substantial nozzle array"), the nozzle positions (nozzle numbers) can be associated with the respective arrangement orders of projected nozzles arranged along the main scanning direction. In the following description, a "nozzle position" indicates the position of a nozzle in the substantial nozzle array. The nozzle position can be represented as an x-coordinate. Accordingly, the nozzle position can be associated with a position in the x direction (x-coordinate). The substantial nozzle array described here corresponds to a "recording element array".

<<On Image Data Input Unit>>

The image data input unit 12 functions as a data acquisition unit for capturing image data 70 representing image content to be printed (output) by the printing system 10. The image data input unit 12 can be configured with a data input terminal that captures image data from another signal processor outside or in the apparatus. The image data input unit 12 may be a wired or wireless communication interface, or a medium interface for reading and writing from and to an external storing medium (removal disk), such as a memory card, or an appropriate combination of these embodiments.

The format of the image data 70 to be input into the image data input unit 12 is not specifically limited. However, for the sake of simplicity of description, the data is a gradation image that has the same color type, number of colors, and resolution as those of the ink colors used for the printing system 10. For instance, in the case of an inkjet printing system that achieves an output resolution of 1200 dpi using inks of four colors, or cyan (C), magenta (M), yellow (Y) and black (K), the image data has 8 bit (256 gradations) for each of CMYK.

The formats of image data for images to be printed may be various. In the case of printing image data specified by a color combination and a resolution format that are different from the ink color type and a resolution used in the printing system 10, a preprocessor, not shown, performs color conversion and resolution conversion before the image data input unit 12 to convert the data into image data with ink colors and a resolution that are used in the printing system 10, and subsequently the converted data is input from the image data input unit 12.

In an example, if the original image data is RGB image data represented in a color signal of a red (R), a green (G) and a blue (B), an RIP (raster image processor) device corresponding to a preprocessor and the like performs a color conversion process from RGB to CMYK and a resolution conversion process, thus converting the RGB image data into the CMYK image data 70 suitable to the printing system 10. The converted data is then input into the image data input unit 12.

<<On Gradation Converter>>

The gradation converter 14 converts the image data into image data having color reproduction properties specified by the printing system 10. For instance, the gradation converter 14 converts the input CMYK signal (CMYK signal before concentration conversion) into concentration-converted CMYK signal according to a gradation converting LUT designated by the print condition manager 44. Alternatively, this converter may convert the input CMYK signal (CMYK signal before concentration conversion) into a concentration-converted C signal, a concentration-converted M signal, a concentration-converted Y signal, and a concentration-converted K signal. The representation of "LUT" in this specification denotes a lookup table.

The gradation converting LUT is a table that describes the relationship of an output signal value (conversion relationship) with respect to an input signal value. The gradation converting LUT is defined for each type of a recording medium used for printing. Multiple gradation converting LUTs are prepared for the respective types of sheets. An appropriate LUT is referred to in conformity with a sheet to be used. Such gradation converting LUTs are prepared for the respective ink colors. In this example, the gradation converting LUTs are provided for the respective CMYK colors.

The image data 70 input from the image data input unit 12 is subjected to a gradation converting process such that a desired gradation is acquired at the gradation converter 14. The gradation converter 14 of this embodiment performs gradation value correction using one-dimensional LUTs (1D-LUTs) preliminarily provided for the respective colors.

Figure 2:
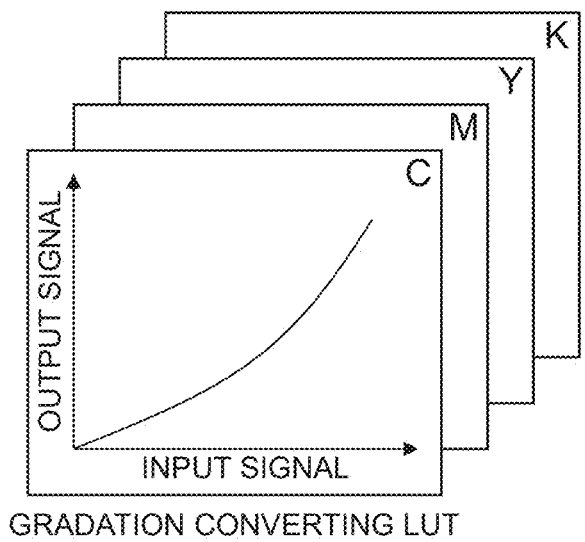
FIG. 2 is a schematic diagram of gradation converting lookup tables (LUTs)

FIG. 2 is a schematic diagram of the gradation converting LUTs. The gradation converting LUTs shown in FIG. 2 are prepared for the respective CMYK color signals, and are LUTs defining input and output relationship for converting input signal values into output signal values. Through use of the gradation converting LUTs, input signals are converted into output signals having target concentration gradations. The image data processed by the gradation converter 14 is transmitted to the concentration unevenness correcting processor 16.

<<Concentration Unevenness Correcting Processor>>

The concentration unevenness correcting processor 16 (see FIG. 1) is a correcting process device that corrects image data according to recording characteristics depending on the positions of the nozzles (positions in the x direction) of the recording head 24. That is, the concentration unevenness correcting processor 16 corrects image signals for preventing concentration unevenness on an printed image on a recording medium, the unevenness occurring owing to variation and the like in ejection characteristics of the nozzles in the recording head 24. In this embodiment, a concentration unevenness correction LUT, which is a one-dimensional lookup table for correcting concentration unevenness that describes the conversion relationship between an input signal value and an output signal value, is prepared for each nozzle in the recording head 24. A signal value is converted using this concentration unevenness correction LUT.

Figure 3:
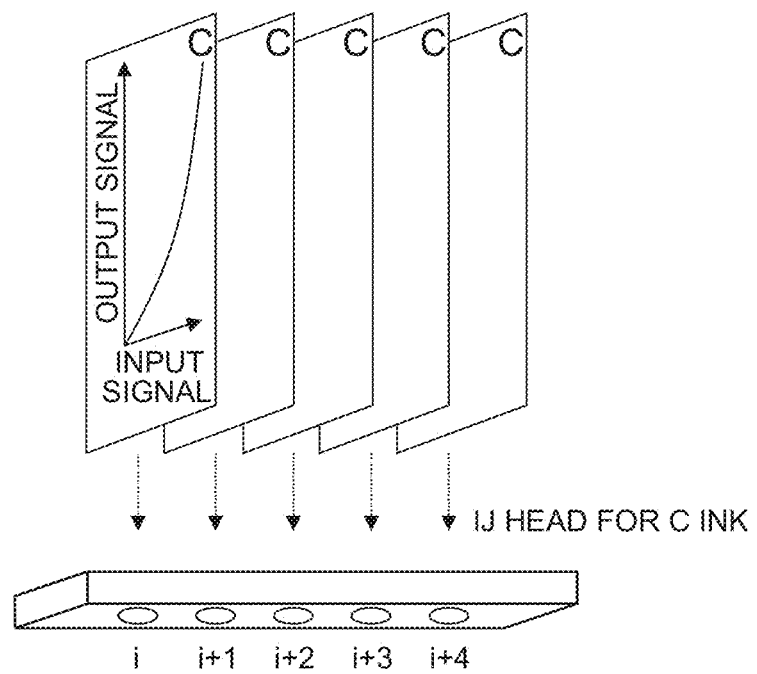
FIG. 3 is a schematic diagram of a correcting process in a concentration unevenness correcting processor.

FIG. 3 is a schematic diagram of a correcting process in the concentration unevenness correcting processor. FIG. 3 shows a schematic view of the recording head for cyan (C) ink with the reduced number of nozzles. In actuality, concentration unevenness correction LUTs are defined for all the respective nozzles included in each color head, corresponding to each nozzle. In FIG. 3, i, i+1, . . . , i+4 designate nozzle numbers. The nozzle number i is an integer number sequentially continuous from an end of the substantial nozzle array in the x direction capable of forming a dot array having a recording resolution (e.g., 1200 dpi) such that i=1, 2, 3, . . . . The numbers can be assigned to the respective nozzles. The nozzle number can identify the position of the nozzle (the nozzle position in the x direction). The nozzle number indicates the arrangement order of nozzles in the substantial nozzle array in the nozzle arrangement where multiple nozzles are arranged such that deposition points (recording positions) on a recording medium can be recorded at a recording resolution.

As shown in the diagram, LUTs that define the conversion relationship between input signal values and output signal values exist for the respective nozzles. The LUTs form a LUT group where the LUTs accumulate for the respective nozzles (all the nozzles in the recording head or some of nozzles). Similar LUT groups exist for all the respective color heads in the recording head 24. These LUT groups are stored in the concentration unevenness correction parameter storage 52 (see FIG. 1).

Although described later in detail, in this embodiment the concentration unevenness correction LUTs are managed in a manner associated with the medium size used for outputting the test chart for measuring concentration for calculating the concentration unevenness correction LUTs. A mechanism is adopted that applies appropriate concentration unevenness correction LUTs in conformity with the medium size of a recording medium used for printing.

For the sake of facilitating understanding, FIGS. 1 to 3 show an example of executing the gradation converting process by the gradation converter 14, and the concentration unevenness correcting process by the concentration unevenness correcting processor 16, which are performed in a stepwise manner. However, a calculation method can be adopted that combines a gradation correction LUT and a concentration unevenness correction LUT into one LUT for signal converting calculation to perform the converting processes in one pass.

Image data generated through the correcting process by the concentration unevenness correcting processor 16 is transmitted to the quantization processor 20.

<<On Quantization Processor>>

The quantization processor 20 converts multi-gradation (m-value) image data into N-value (N is an integer that is at least 2 and less than m) data that can be output by the recording head 24 through a quantization method (what is called digital halftoning process method), such as an error diffusion method, dithering method, or concentration pattern method. For instance, the quantization processor 20 performs a process of converting 8-bit and 256-gradation image data into dot image data of four-gradation (N=4) including a large dot, a medium dot, a small dot and no dot.

N-value image data generated by the quantization processor 20 is subjected to conversion in conformity with the nozzle arrangement and output to the head driver 22. A drive signal (marking signal) is supplied to the recording head 24 via the head driver 22 to control the ink ejection operation of the recording head 24.

<<On Medium Conveyor>>

Conveyance of the recording medium by the medium conveyor 26 and ejection of ink from the recording head 24 are controlled to thereby form an image on the recording medium. The medium conveyor 26 is a device that conveys the recording medium. Here, the recording medium is conveyed at a constant speed in a sub-scanning direction (y direction) orthogonal to the longitudinal direction (x direction) of the recording head 24. The medium conveyor 26 can adopt any of various methods, such as a drum conveyance method, a belt conveyance method, and a nip conveyance method. Although the detailed structure of the medium conveyor 26 is not shown, the structure includes sheet feeding rollers, conveyance motors, motor driving circuits and the like. Furthermore, in order to synchronize recording timing of the recording head 24 with the recording medium, a sensor (e.g., an encoder) that detects the position of the recording medium is provided.

Conveyance of the recording medium in a prescribed direction by the medium conveyor 26 relatively moves the recording head 24 and the recording medium from each other. The medium conveyor 26 corresponds to a relative movement device that relatively moves the recording medium with respect to the recording head 24.

<<On Image Reader>>

The image reader 28 causes the recording head 24 to read the image recorded on the recording medium, and converts the image into electronic image data (read image data). The image reader 28 may be, for instance, a CCD line sensor. The image reader 28 of this example is an in-line sensor provided at the middle of a medium conveyance path, and reads the image recorded by the recording head 24 during conveyance before sheet ejection. The image reader 28 can read an output result of the test chart, which is a test chart for measuring concentration or the like described later. The image reader 28 can read a printed image recorded on the basis of the image data of the print object designated by the print job.

<<On Test Chart Generator>>

The test chart generator 40 generates data of the test chart for measuring concentration for acquiring concentration measurement data that is required to calculate concentration unevenness correction parameters, and provides the data for the image data input unit 12. The test chart generator 40 can generate data of various test charts, which include not only a test chart for measuring concentration but also a test chart for detecting a failed nozzle, a test chart for calculating correction parameters for correcting failed ejection, and the like. The test chart generator 40 supplies corresponding data of a test chart to the image data input unit 12 according to an instruction by the controller 62.

<<On Concentration Unevenness Correction Parameter Calculator>>

The concentration unevenness correction parameter calculator 32 is a calculator that measures concentrations on the basis of a image read from the test chart for measuring concentration acquired from the image reader 28, and generates correction value data (concentration unevenness correction parameter) for concentration unevenness for each nozzle position. The concentration unevenness correction parameters generated by the concentration unevenness correction parameter calculator 32 are stored in the concentration unevenness correction parameter storage 52 under management by the parameter manager 60.

<<On Parameter Manager>>

The parameter manager 60 manages information stored in the concentration unevenness correction parameter storage 52. The management by the parameter manager 60 includes new registration of parameters, update of parameters (including rewriting, addition), management of updated date and time, and the like. The parameter manager 60 cooperates with the print condition manager 44 to control reading of parameters that are to be passed to the concentration unevenness correcting processor 16.

<<Print Condition Manager>>

The print condition manager 44 manages information on a print job that associates the image data as the print object with the information on print conditions. When a user inputs image data on the print object or after the user inputs the image data, the user can input setting information on print conditions. The print condition manager 44 generates information on a print job that associates image data as the print object with setting information on print conditions, and stores and manages the information in units of print jobs. The output image data name, the name of the type of the recording medium (sheet type), the medium size, various pieces of parameter information used for image processing are stored in an associated manner for each print job.

When the print job for the print object is selected, the print condition manager 44 sets, in the processor concerned, various parameters and data designated by the print job pertaining to the selection.

<On Process of Creating Concentration Unevenness Correction Parameters>

Here, the process of creating concentration unevenness correction parameters is described. The process of creating concentration unevenness correction parameters (concentration unevenness correction LUT) to be applied to the correction process by the concentration unevenness correcting processor 16 shown in FIG. 1 is performed in cases where a new inkjet head is mounted, for instance, in a case where an inkjet recording apparatus is newly installed or in a case where the head is replaced. Furthermore, the process is performed at an appropriate timing including a case where the inkjet head temporarily deteriorates, a case where periodical maintenance timing is reached, and a case where unevenness occurs in an image outputting operation at activation of the apparatus. Thus, the process creates the concentration unevenness correction parameters for the respective nozzles.

Various methods may be adopted as a method of creating the concentration unevenness correction parameters. The methods include the method described in Japanese Patent Application Laid-Open No. 2010-082989 and other publicly known methods.

Figure 4:
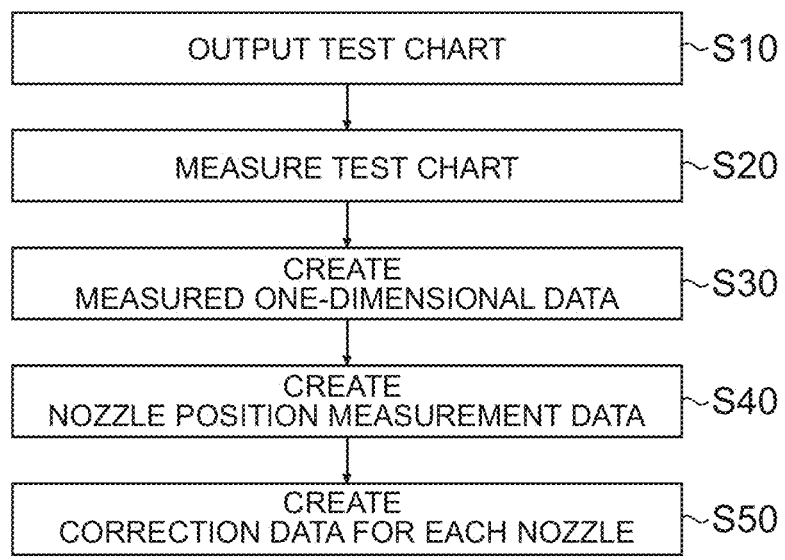
FIG. 4 is a flowchart showing an overview of procedures for creating concentration unevenness correction parameters.
Figure 5:
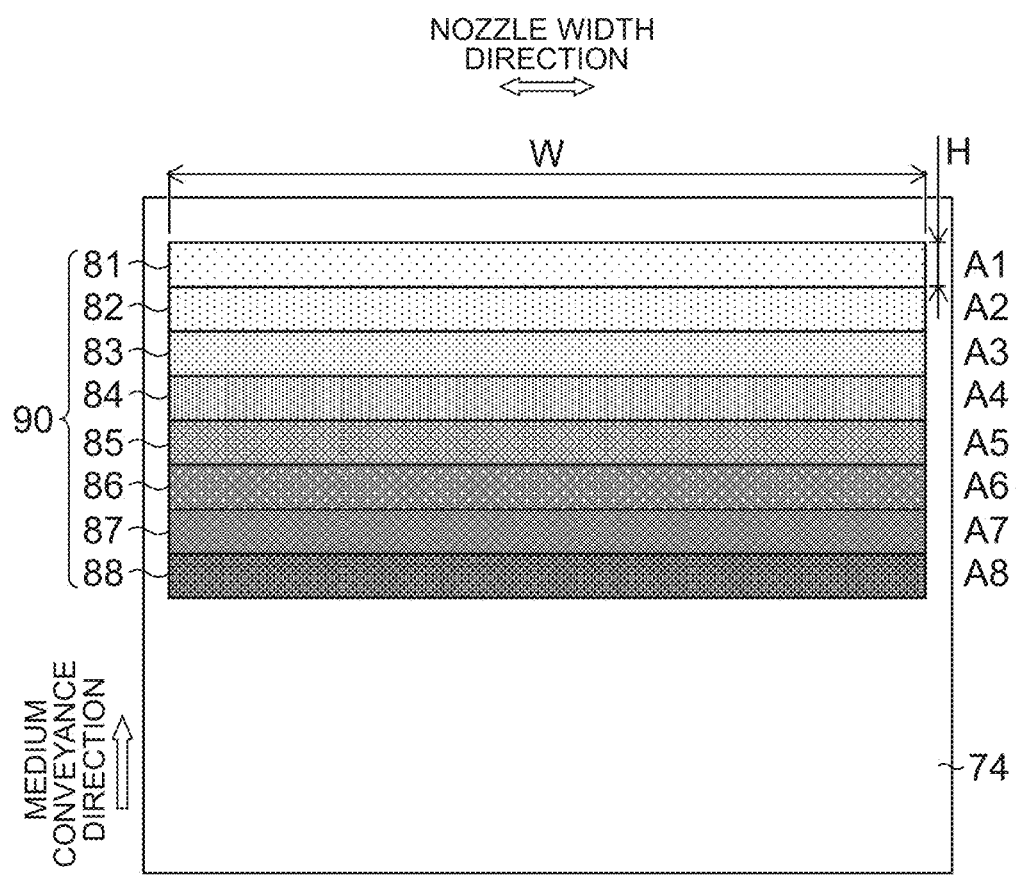
FIG. 5 is a diagram showing an example of a test chart for measuring concentration.

FIG. 4 is a flowchart showing an overview of procedures for creating concentration unevenness correction parameters. FIG. 5 is a diagram showing an example of the test chart for measuring concentration recorded on the recording medium. The processing flow shown in FIG. 4 and the details of the process illustrated in FIG. 5 are a process for one of multiple colors used in the printing system 10.

As shown in FIG. 4, the process of creating concentration unevenness correction parameters includes a test chart output step (step S10), a test chart measurement step (step S20), a measured one-dimensional data creation step (step S30), a nozzle position measurement data creation step (step S40), and a correction data creation step for each nozzle (step S50). Each of the steps is hereinafter described.

[1] Test Chart Output Step (Step S10)

In the test chart output step (step S10), the image data of the test chart for measuring concentration generated by the test chart generator 40 (see FIG. 1) is transmitted to the image data input unit 12, an image of the test chart for measuring concentration is recorded by the recording head 24 on the recording medium 74 (see FIG. 5).

The test chart generator 40 (see FIG. 1) creates image data of the test chart for measuring concentration where concentration patches having uniform concentrations of respectively predetermined gradation values A1 to A8 are arranged in the medium conveyance direction in a rectangular region having a width W in the nozzle arrangement direction (the medium width direction orthogonal to the medium conveyance direction) of the recording head 24 and a height H in the medium conveyance direction, and supplies the data to the image data input unit 12. That is, the test chart generator 40 generates image data (referred to as "image data for the test chart") used for outputting the test chart for measuring concentration including the multiple stages of concentration patches according to an instruction with uniform concentrations of the respective gradation values A1 to A8, and transmits the data to the image data input unit 12.

A test chart image is output by the recording head 24 on the basis of the image data for the test chart.

As shown in FIG. 5, a test chart for measuring concentration 90 where strip-shaped concentration patches 81 to 88 having a width W and a height H are arranged are recorded on the recording medium 74 arrayed in the medium conveyance direction. The concentration patches 81 to 88 are configured to have the respective gradation values A1 to A8 as input values, and corresponds to regions recorded according to the configured gradation values A1 to A8.

Thus, the test chart for measuring concentration 90 is a chart where the concentration patches 81 to 88 that has constant gradation values in the nozzle width direction and a prescribed height H in the sheet conveyance direction are printed into multiple stages (in FIG. 5, eight stages from the input gradation value A1 to the input gradation value A8) in the medium conveyance direction. Here, the concentration patches are arranged so as to be printed in an ascending order of the input gradation value from the concentration patch 81 having the lowest input gradation value A1 to the concentration patch 88 having the highest input gradation value A8. However, the number of stages of the concentration patches and the arrangement order are not limited thereto.

The number of stages of the concentration patches may be a number that divides the domain (e.g., 0 to 255) of the signal values of the image data at appropriate intervals. The number is appropriately designed in consideration of the length in the medium conveyance direction required to output the test chart, the number of sheets, processing time for correction calculation, and the like.

The nozzle range (the nozzle array width in the nozzle width direction) used for outputting the test chart for measuring concentration 90 varies according to the medium size of the recording medium 74 in the medium width direction.

[2] Test Chart Measurement Step (Step S20 in FIG. 4)

Subsequently, the image reader 28 (see FIG. 1) reads the output result of the test chart for measuring concentration 90, and measures the test chart. It is sufficient that one-dimensional concentration data on the gradation values A1 to A8 in the nozzle width direction can be finally acquired from the respective concentration patches 81 to 88. A specific device to be used for measurement is not specifically limited. For instance, the image reader 28 may be a device having a function of calculating a one-dimensional concentration value in the nozzle width direction. Alternatively, an in-line scanner (image reader 28) that is incorporated in an inkjet printer and can capture an output image of the test chart may be adopted. This test chart measurement step can acquire read image data of an output result of the test chart for measuring concentration 90.

A test chart reading device may cause an off-line scanner (reading device) to separately read a printed matter after sheet ejection. Alternatively, use of an in-line scanner is more preferred because reading can be made in a short time and easily and efficiently.

[3] Measured One-Dimensional Data Creation Step (Step S30 in FIG. 4)

If a test chart image is read in the test chart measurement step (step S20), the positions of edges of strip-shaped rectangular concentration patches 81 to 88 corresponding to the respective gradations A1 to A8 are recognized through image processing from the captured image. The signals are integrated in the medium conveyance direction (y direction) for each of the concentration patch 81 to 88 having the respective gradations to create one-dimensional luminance data in the nozzle width direction (x direction).

At this time, luminance data with the highest sensitivity may be selected for each of C, M, Y and K. For instance, in the case of adopting a reading device that includes a color image pickup element including RGB color filters, the highest sensitive color data can be used among RGB color signals. In measurement of the test chart, it is sufficient that information representing the concentrations of a printed matter (e.g., signals representing optical concentrations, luminances, and brightness) be acquired, irrespective of the signal types (indicator). The embodiment is not only an embodiment that uses the highest sensitive signal among R, G and B color signals but also an embodiment using a luminance signal (Y signal) calculated from the RGB signal or an L* value in an Lab color representation system.

The measured one-dimensional data is created at a reading resolution of the image reader 28. The image reader 28 is required to resolve unevenness viewable by a person. At least about 200 to 300 dpi is desired to be resolved. The higher the resolution is, the more preferred it is because data with a high accuracy is acquired. However, the high resolution increases the data processing time and the cost of the configuration of the apparatus. Accordingly, about 600 dpi is preferred.

[4] Nozzle Position Measurement Data Creation Step (Step S40)

Next, interpolation is performed by steps of the resolution (recording resolution) of the nozzles of the recording head 24 on the basis of the measured one-dimensional data at the reading resolution of the image reader 28 (e.g., 600 dpi in the nozzle array width), thereby creating concentration measurement data (concentration measurement data for each nozzle) for each nozzle position.

The concentration measurement data for each nozzle position described here is data representing the relationship between an input concentration value (the image data value of each concentration patch) and a concentration measurement value.

[5] Creation Step of Correction Data for Each Nozzle (Step S50)

Next, a concentration conversion curve for each nozzle, i.e., a concentration unevenness correction LUT, is calculated from the concentration measurement data for each nozzle position acquired in step S40 and target gradation characteristics (reference concentration conversion curve). The concentration measurement data for the discrete gradation values A1 to A8 is interpolated to thereby acquire concentration data for gradations values for points other than measurement points.

For instance, on the basis of the difference from the target gradation value acquired from the luminance value (concentration measurement data) for each nozzle, correction curve (correction function) is created where the gradation for each nozzle is the target gradation. The correction curve is a function that defines the conversion relationship for converting an input gradation value into a target gradation. The thus acquired correction curve serves as the concentration unevenness correction LUT (one-dimensional LUT).

Through these procedures (step S10 to S50 in FIG. 4), the concentration unevenness correction LUTs for the respective nozzles (corresponding to "concentration unevenness correction parameters") are created.

In this embodiment, parameters are managed in consideration of combination between the medium size in the x direction of the recording medium 74 that is used for outputting the test chart for measuring concentration 90 when the concentration unevenness correction parameters are newly created and the updated date and time of the concentration unevenness correction parameters.

<On Medium Size>

Figure 6:
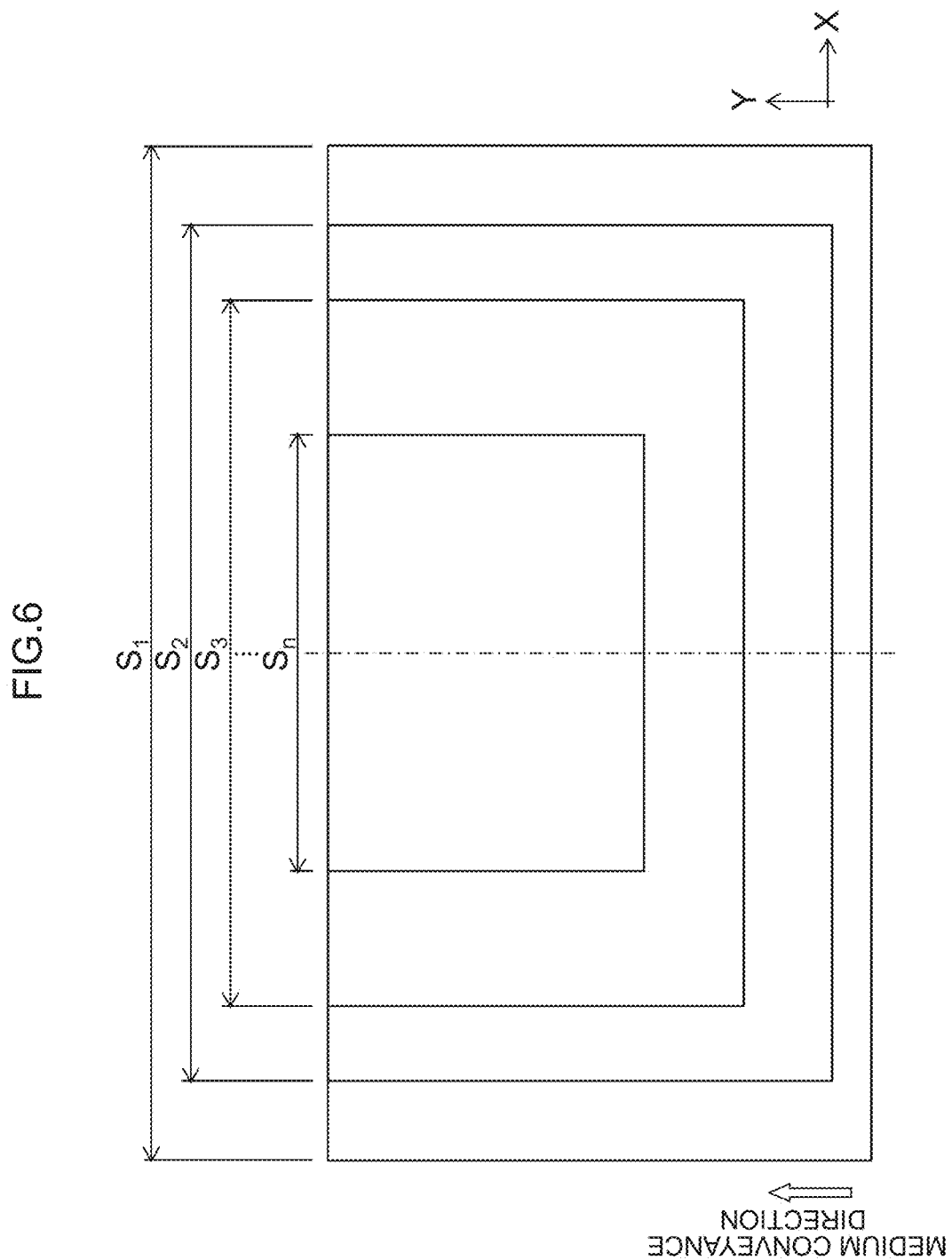
FIG. 6 is a diagram for illustrating the types of medium sizes.

It is provided that the types of medium sizes usable by the printing system 10 in this embodiment are $S_1, S_2, S_3, \ldots, S_n$ (n is an integer at least two) and the sizes have a relationship, $S_1 > S_2 > S_3 > \ldots > S_n$ (see FIG. 6). That is, the larger the number of the subscript [i] of the symbol $S_i$ (i=1, 2, . . . , n) representing medium size is, the smaller the medium size is. According to this representation of the medium size, "$S_1$" is the maximum usable size in the system.

The medium size described here means the medium width size in the x direction (the length in the x direction). In this embodiment, the image processing parameters depending on the position in the x direction is dealt with. Accordingly, there is no need to specifically consider the size in the y direction.

According to the medium size (the width in the x direction) of the recording medium used for printing, the nozzle range (the nozzle width in the x direction) of the recording head 24 that is used for drawing on the recording medium is identified. Here, for the sake of simplicity of description, the "medium size" of the recording medium is adopted. However, what is important to implement the invention is a positional range of the parameter in the x direction (referred to as a "parameter size") that can be used or updated in an image recordable range in the x direction. Accordingly, any type of information capable of identifying the parameter size can be used; the information on medium size is not necessarily used. The information on the nozzle range (nozzle array width), which is the image recordable range corresponding to the medium size, can be used, replacing the information on the medium size. The nozzle range on the line head indicates the image recording range.

For the printing system 10 in this embodiment, several types of medium sizes expected to be used in the system are preliminarily assumed. For instance, a size to be used by a user can be selected from among multiple types of medium sizes, such as kiku-zenhan (939 mm×636 mm), kiku-hansai (636 mm×469 mm), shiroku-zenhan (1091 mm×788 mm), and shiroku-hansai (788 mm×545 mm) through a user interface. Note that any size of a recording medium can be used that is other than preliminarily provided prescribed sizes.

<Operations During Printing>

In this embodiment, during printing of image data according to a print job, the following rule is followed.

[Rule] In the case of printing on a specific medium size $S_i$ (any of i=1, 2, . . . , n), the latest parameters are used for printing among image processing parameters calculated from the read result of the test chart recorded on the recording medium having a medium size identical to or larger than $S_i$.

In the example in FIG. 1, the concentrate measurement test chart is the "test chart", and the concentration unevenness correction parameters (concentration unevenness correction LUTs) are "image processing parameter".

For printing the image data, the concentration unevenness correction parameters are applied according to the foregoing rule and then image processing is performed, which can perform printing using the latest concentration unevenness correction parameters without inconformity.

At a certain timing, the concentration unevenness correction parameters are not necessarily prepared for all the medium sizes. At least with the concentration unevenness correction parameters for the maximum usable size ($S_1$) in the system, any of parameters can be surely selected according to the foregoing rule.

Preferably, as an initial setting of the printing system 10, a test chart for measuring concentrations are output using a recording medium with the maximum size $S_1$ when the system is installed or the apparatus is shipped, the concentration unevenness correction parameters for all the nozzle ranges are generated, and these concentration unevenness correction parameters for all the nozzle ranges (the maximum size $S_1$) are stored. Subsequently, even when a user appropriately updates concentration unevenness correction parameters, it is preferred that the concentration unevenness correction parameters for all the nozzle ranges at the initial setting be continuously held separately as setup data.

Figure 7:
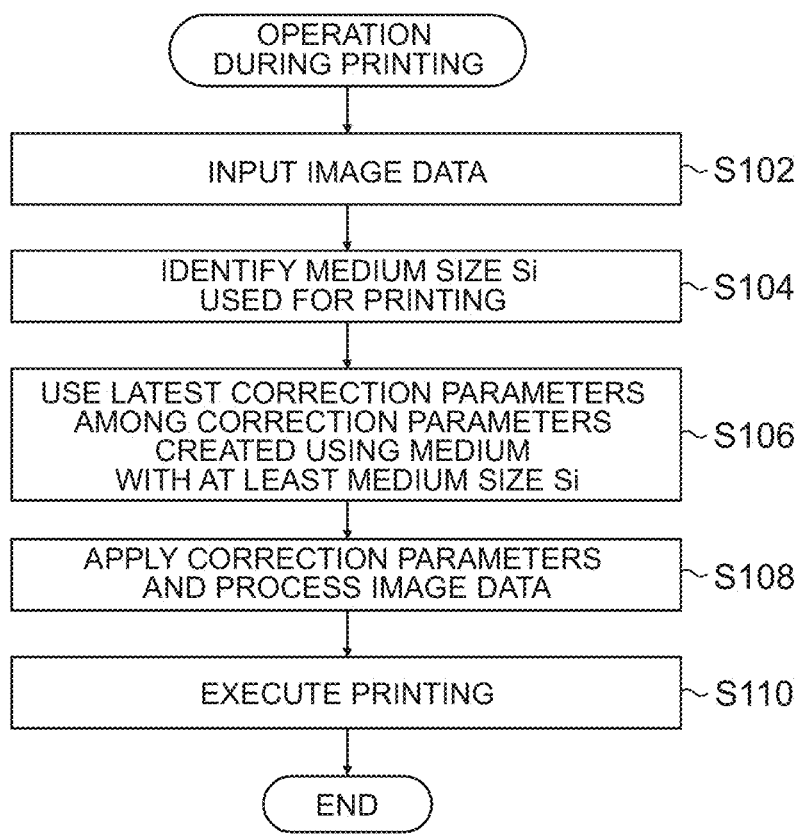
FIG. 7 is a flowchart showing operations during printing according to this embodiment.

FIG. 7 is a flowchart of operations during printing (an image recording method) according to the foregoing rule. First, image data of a print object is input (step S102), and a medium size $S_i$ used for printing is identified (step S104). Information on the medium size $S_i$ used for printing can be acquired from information on print conditions that is described in the print job. Alternatively, the user can identify a desired sheet size through the input device. The order of steps S102 and S104 can be replaced with each other.

Next, as to the rule of which correction parameters are applied as correction parameters to be applied to image processing, the latest parameters among concentration unevenness correction parameters calculated from a read result of a test chart for measuring concentration recorded using a recording medium having a size identical to or larger than the medium size $S_i$ used for printing (step S106).

The latest correction parameters specified in step S106 are applied to the concentration unevenness correcting processor 16 to process the image data (step S108). An image is recorded (printed) using image data thus acquired after processing (step S110).

<On Operation of Updating Parameters>

In the case of creating concentration unevenness correction parameters with a certain medium size $S_i$, concentration unevenness correction parameters created using a recording medium with a smaller medium size than $S_i$, i.e. any of recording media with $S_i+1, S_i+2, \ldots, S_n$, before a timing of creation of the parameters this time are not used thereafter. That is, the new parameters created for $S_i$ is applied as concentration unevenness correction parameters to be applied in the case of a medium size with $S_i$ or less. Thus, the latest parameters can be used for medium sizes as much as possible.

Specific methods where the parameters "are not used thereafter" are, for instance, various methods can be adopted including the following methods [1] to [3].

[1] A method of copying parameters for $S_i$ to parameters for $S_{i+1}, S_i+2, \ldots, S_n$.

[2] A method of discarding the parameters for $S_{i+1}, S_{i+2}, \ldots, S_n$.

[3] Without foregoing copy in [1] or discard in [2], control is performed such that parameters $S_{i+1}, S_{i+2}, \ldots, S_n$ are not used (unused) during execution of printing.

Any method can be adopted if only the method can achieve that parameters "are not used thereafter".

The method [1] requires procedures of copying, but has an advantage of simplifying conditional branching during printing.

The method [2] has an advantage of reducing storage region for parameters.

The method [3] has an advantage allowing processes during updating parameters to be simplified and executed with the small number of procedures.

The above exemplified methods can specify image processing parameters that have been generated on the basis of the measurement result of the test chart output using a medium size smaller than $S_i$ before the timing of generating the latest image processing parameters not to be used after the timing of generating the latest image processing parameters.

At a timing of newly output of a test chart to optimize parameters, i.e., on updating to the latest image processing parameters, it is preferred to specify the old parameters not to be used.

Exemplary Embodiment According to Method [1]

Figure 8:
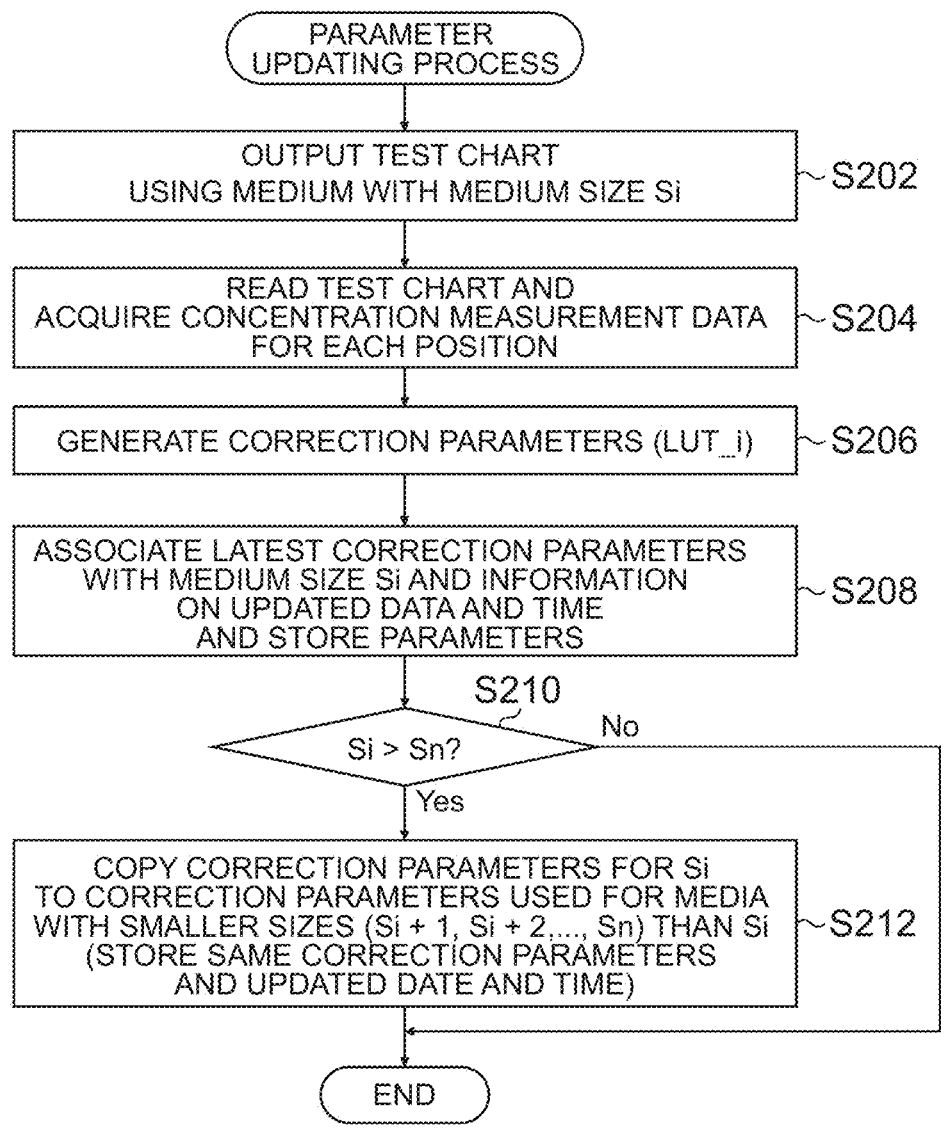
FIG. 8 is a flowchart showing a first example of a parameter updating process.

FIG. 8 is a flowchart of a parameter updating process according to the method [1].

First, a test chart is output using a recording medium with a medium size $S_i$ (step S202). The output test chart is read, and concentration measurement data for each nozzle position is acquired (step S204). On the basis of the acquired concentration measurement data, a concentration correction parameter LUT_i for each nozzle position is generated (step S206). The timing of generating the concentration correction parameter LUT_i corresponds to the "timing of generating the latest image processing parameters".

This latest concentration correction parameter LUT_i is associated with information on the medium size $S_i$ and the updated date and time and stored (step S208).

Next, it is determined whether the medium size $S_i$ is larger than the minimum size $S_n$ or not (step S210). If the medium size $S_i$ is larger than the minimum size $S_n$, the latest correction parameters generated in step S206 to S208 are copied as correction parameters to be used for what have a smaller medium size ($S_{i+1}, S_{i+2}, \ldots, S_n$) than $S_i$ (step S212).

If the medium size $S_i$ is the minimum size $S_n$ in the determination in step S210, the process in step S212 is omitted and the processing is finished.

FIG. 9 is a schematic diagram of data stored in the concentration unevenness correction parameter storage 52 when a parameter updating process is performed according to the flow of FIG. 8. In FIG. 9, the types of medium sizes $S_1, S_2, S_3, S_4, \ldots, S_n$ are described in a field of "Sheet Width". In conformity with each medium size, the nozzle range (nozzle width) used for drawing on a recording medium with the size is identified. "$xa_i$" and "$xb_i$" (i=1, 2, 3, \ldots, n) indicate nozzle numbers for identifying the nozzle positions corresponding to the image recording positions in the x direction. In the case where the nozzle number j (j is an integer) is assigned in the arrangement order of nozzles from one end to the other end of the substantial nozzle array configuring the image recordable range in the x direction in the recording head 24, the relationship of $xa_j < xa_{j+1}$, $xb_{j+1} < xb_i$ and $xa_j < xb_j$. That is, in the relationship, the nozzle range represented as [$xa_j$-$xb_j$] includes the nozzle range represented as [$xa_{j+1}$-$xb_{j+1}$]. The nozzle range represented as [$xa_j$-$xb_j$] corresponds to the image recording range in the x direction for recording an image on the recording medium with the medium size $S_i$.

The example of FIG. 9 shows situations where, when the test chart for measuring concentration is output using a recording medium with the medium size $S_3$ and the concentration correction parameter LUT_3 is updated on the basis of the read result, the LUT_3 is copied to the correction parameter LUT_4 to LUT_n having smaller medium sizes $S_4$ to $S_n$ than $S_3$. In this case, the medium size $S_3$ corresponds to the "specific medium size" or the "specific range".

Figure 10:
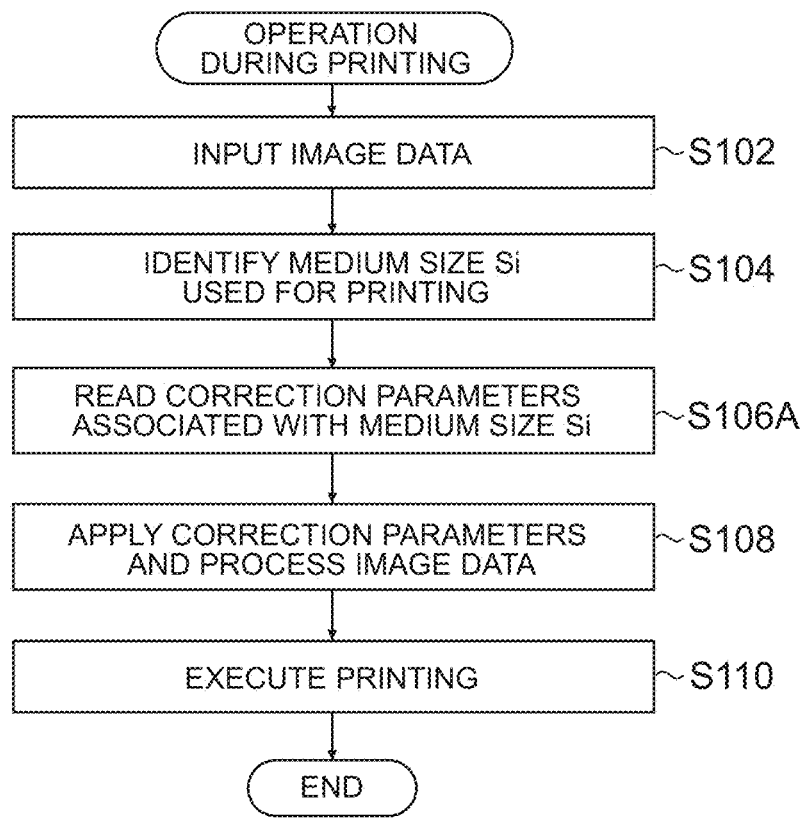
FIG. 10 is a flowchart showing operations during printing in the case of updating parameters according to the flow of FIG. 8.

FIG. 10 is a flowchart showing operations during printing in the case of applying the flow of FIG. 8 and updating parameters.

In FIG. 10, the same step numbers are assigned to steps common to the steps in the flow shown in FIG. 7. The description thereof is omitted.

In the flowchart of FIG. 10, as described in FIG. 8, the latest correction parameters corresponding to each medium size are held for each medium size. Accordingly, the medium size $S_i$ is identified in step S104, subsequently the correction parameters (LUT_i) associated with the medium size $S_i$ are read (step S106A), and image data to which the correction parameters are applied is processed (step S108).

Thus, as a result, functions equivalent to the functions of the flow described in FIG. 7 can be achieved.

Exemplary Embodiment According to Method [2]

Figure 11:
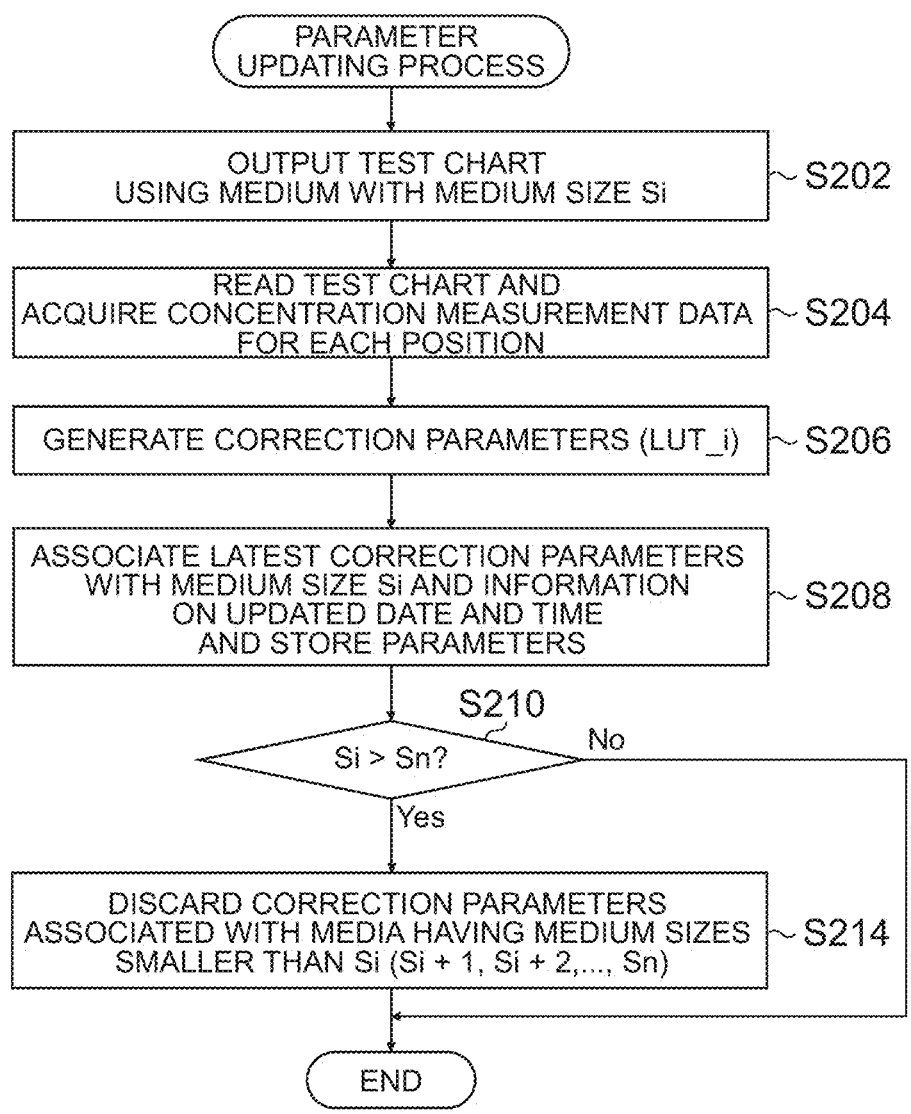
FIG. 11 is a flowchart showing a second example of a parameter updating process.

FIG. 11 is a flowchart of a parameter updating process according to the method [2]. In FIG. 11, the same step numbers are assigned to steps common to the steps in the flow shown in FIG. 8. The description thereof is omitted. In the flowchart of FIG. 11, if the medium size $S_i$ is larger than the minimum size $S_n$ in the determination in step S210, the processing proceeds to step S214. In step S214, the correction parameters associated with the media having medium sizes smaller than $S_i$ ($S_{i+1}, S_{i+2}, \ldots, S_n$) are discarded.

FIG. 12 is a schematic diagram of data stored in the concentration unevenness correction parameter storage 52 in the case of performing the parameter updating process according to the flow of FIG. 11. The example of FIG. 12 shows situations where a test chart for measuring concentration is output using the recording medium with the medium size $S_3$, and, when the concentration correction parameter LUT_3 is updated on the basis of the read result, the correction parameter LUT_4 to LUT_n for the medium sizes $S_4$ to $S_n$ smaller than $S_3$ are discarded, and, a blank state (without data) is established in the situations. In this case, the medium size $S_3$ corresponds to the "specific medium size" or the "specific range".

If printing is performed on a recording medium with a medium size $S_3$ or a smaller size ($S_4$ to $S_n$), control through use of the concentration correction parameter LUT_3 for $S_3$ is performed.

Figure 13:
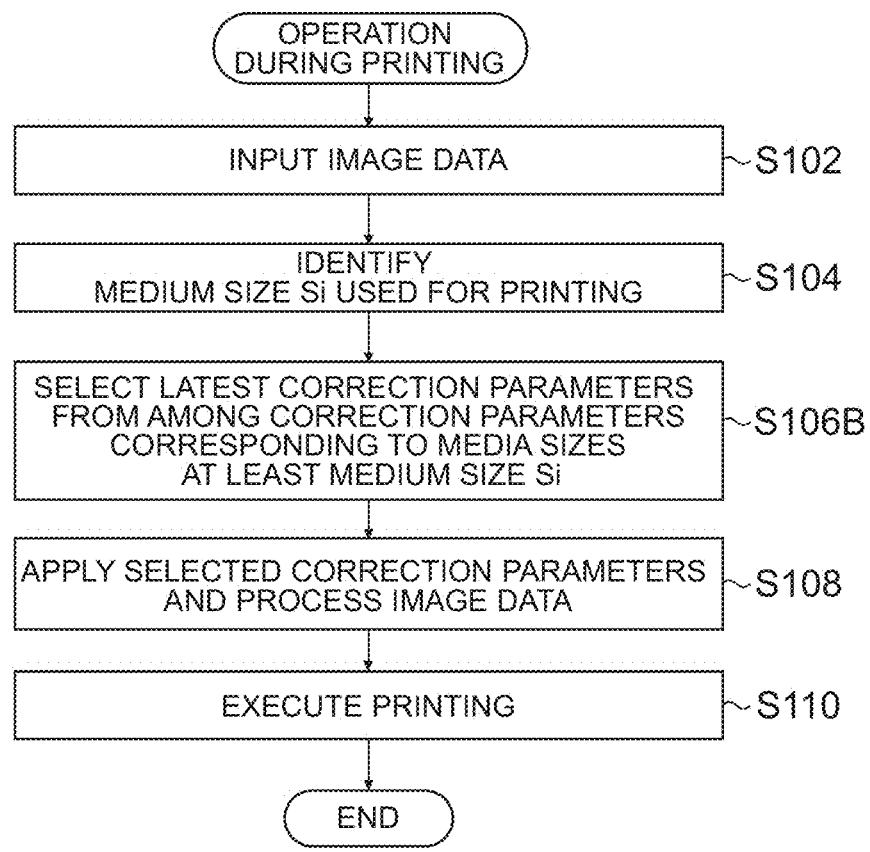
FIG. 13 is a flowchart showing operations during printing in the case of updating parameters according to the flow of FIG. 11.

FIG. 13 is a flowchart showing operations during printing in the case of applying the flow of FIG. 11 and updating parameters. In FIG. 13, the same step numbers are assigned to steps common to the steps in the flow shown in FIG. 7. The description thereof is omitted.

In the flowchart of FIG. 13, when the medium size $S_i$ used for printing is identified (step S104), the latest correction parameters are selected from among correction parameters with media sizes $(S_i, S_{i-1}, \ldots, S_1)$ larger than the medium size $S_i$ (step S106B).

In the example of FIG. 12, if the medium size used for printing is $S_4$, the latest correction parameter LUT_3 is selected from among the correction parameter LUT_3 to LUT_1 corresponding to the media sizes $(S_4$ to $S_i)$ at least $S_4$.

If the medium size used for printing is $S_2$, the latest correction parameter LUT_2 is selected from among the correction parameter LUT_2 and LUT_1 corresponding to the media sizes $(S_2, S_1)$ at least $S_2$.

Thus, the correction parameters selected in the step S106B of FIG. 13 are applied and image data is processed (step S108), and printing is performed (step S110).

In the foregoing manner, functions equivalent to the flow illustrated in FIG. 7 can be achieved.

In each of cases of the method [1] and the method [2], the correction parameters for a size larger than the correction parameters created last time are required to be held.

Exemplary Embodiment According to Method [3]

Figure 14:
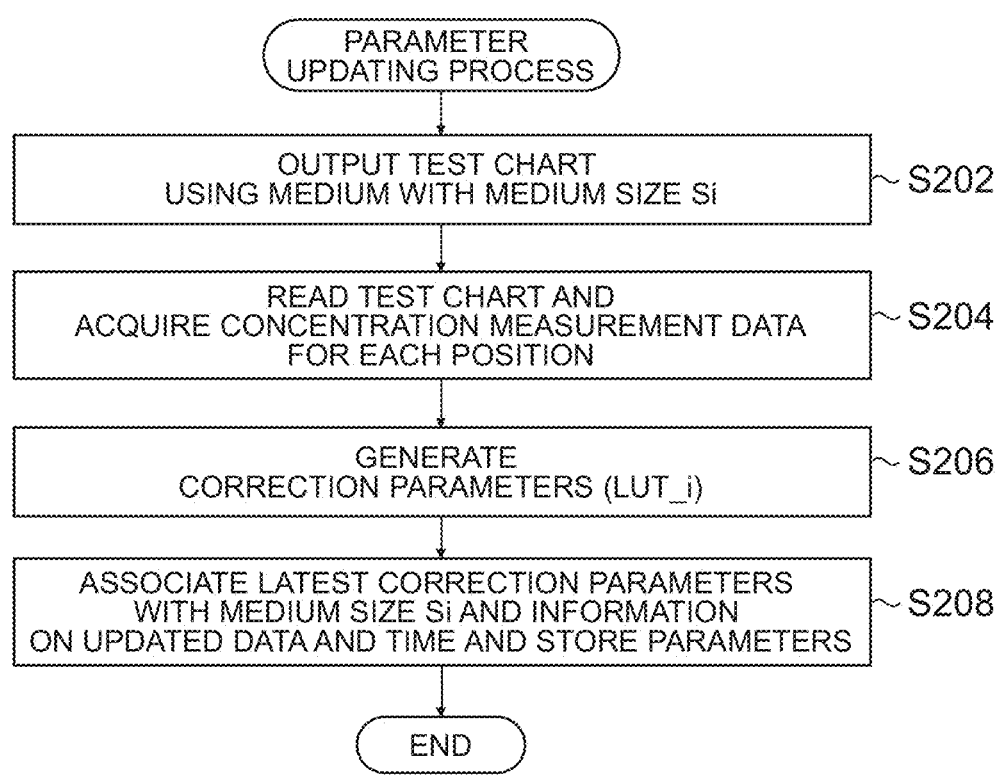
FIG. 14 is a flowchart showing a third example of a parameter updating process.

FIG. 14 is a flowchart of parameter updating process according to the method [3]. In FIG. 14, the same step numbers are assigned to steps common to the steps in the flow shown in FIG. 8. The description thereof is omitted. In the flowchart of FIG. 14, according to steps S202 to S208, the newly created latest correction parameter are associated with information on the medium size $S_i$ and the updated date and time and stored.

FIG. 15 is a schematic diagram of data stored in the concentration unevenness correction parameter storage 52 when the parameter updating process is performed according to the flow of FIG. 14. FIG. 15 shows an example where a test chart for measuring concentration is output using a recording medium with the medium size $S_3$ and the correction parameter LUT_3 is updated on the basis of the read result.

If the correction parameters have been created using a recording medium with another medium size, the corresponding correction parameters are left as they are and only the newly created latest correction parameters are updated.

The operations during printing in the case of updating parameters by applying the flow of FIG. 14 are according to the flowchart of FIG. 7.

In the example of FIG. 15, if the medium size to be used for printing is, e.g., $S_4$, the latest correction parameter LUT_3 is selected from among the correction parameter LUT_4 to LUT_1 created using the respective medium sizes $(S_4$ to $S_i)$ at least $S_4$.

If the medium size to be used for printing is $S_2$, the latest correction parameter LUT_2 is selected from between the correction parameter LUT_2 and LUT_1 created using the respective medium sizes $(S_2, S_1)$ at least $S_2$.

When the parameter updating process described with reference to FIGS. 14 and 15 is performed, a rule as an object can be achieved by performing the control during printing described with reference to FIG. 7.

<On Cases with Different Conditions Other than Medium Sizes>

If the print conditions including the medium type (coated paper, uncoated paper, types and brands of paper, etc.), ink type, halftoning method (quantization method) and the like, which are other than the medium size are different, there is a possibility that appropriate concentration unevenness correction parameters be different depending on the conditions.

Accordingly, it is preferred that the foregoing [Rule] not be applied to print conditions that are different in print conditions other than the medium size. Furthermore, it is preferred that concentration correction parameters be separately managed according to the [Rule] for each print condition between different print conditions.

FIG. 16 is a schematic diagram showing an example of a structure of data in the case of managing correction parameters for each print condition. FIG. 16 shows the example where correction parameter groups in consideration of the medium size and the updated date and time are managed with respect to combinations of conditions including the medium type, the ink type, and the quantization method.

For the sake of illustration, FIG. 16 only shows print conditions of specific combination of conditions including the medium type condition M_1, the ink type condition INK_1, and the quantization method condition HT_1. Corresponding correction parameter groups are associated with the respective different print conditions and managed. That is, image processing parameters are stored in association with at least one combination of print conditions including the medium type, the ink type, and the quantization method. If print conditions other than the medium size (image recording range) are different, it is preferred that the foregoing [Rule] be not applied to the different print conditions.

According to the method exemplified in FIGS. 8 to 15, if image processing is performed using the latest image processing parameters for a certain specific medium size, image processing parameters generated on the basis of a measurement result of a test chart output using a smaller medium size than the specific medium size before the timing of the image processing is specified to be unused after the image processing (set to be unused).

<On Application to Image Processing Parameters Other than Concentration Unevenness Correction Parameter>

In the aforementioned embodiment, description has been made with the example of the concentration unevenness correction parameters. However, application of this technique is not limited only to the concentration unevenness correction parameters. Alternatively, the technique is also applicable to any image processing parameter that is stored in association with the position and range in the x direction. That is, the technique of the present invention is applicable to various image processing parameters, which are a parameter group varying with respect to the x direction.

Another example of such image processing parameters is mapping parameters that define correspondence relationship between the failed ejection correction parameters or the read image position of the image reader 28 and the recording position (nozzle position) of the recording head 24.

<On Technique of Failed Ejection Correction>

In drawing by an inkjet apparatus, after the inkjet head is started to be used, some nozzles are caused to be in a failed ejection state owing to nozzle clogging or failure. In the case of drawing according to a single-path method, a failed ejection nozzle spot is viewed as a white stripe on a printed matter. Thus, correction against the stripe, or 'failed ejection correction', is required. Many failed ejection correction techniques have been proposed (e.g., Japanese Patent Application Laid-Open No. 2012-71474).

Figure 17:
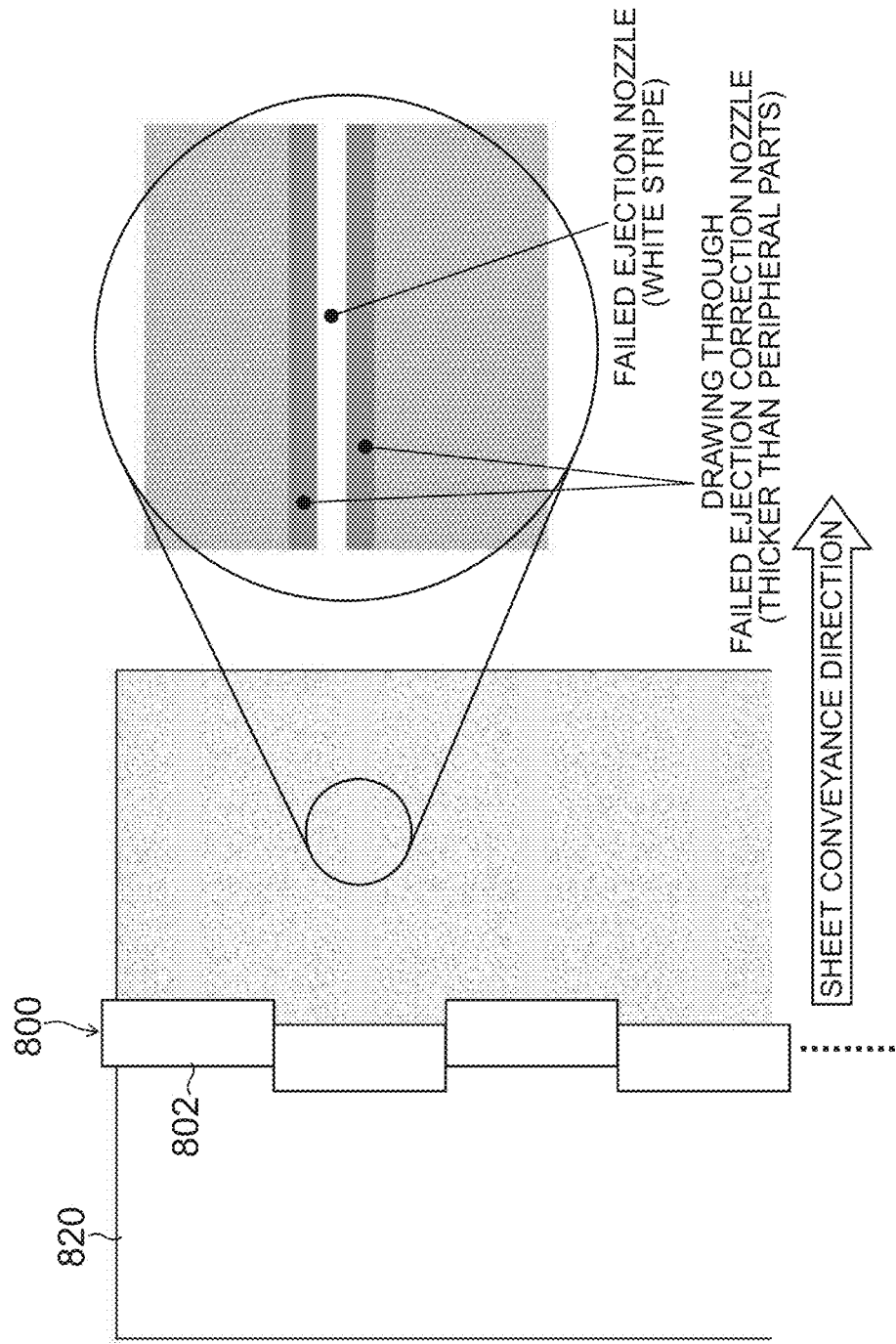
FIG. 17 is a schematic diagram of a fundamental concept of failed ejection correction.

FIG. 17 shows a schematic diagram of a fundamental concept of failed ejection correction. In FIG. 17, a recording head 800 is a line head that includes multiple head modules 802 longitudinally combined into a long shape. A recording medium 820 is conveyed to the recording head 800. An image is recorded by the recording head 800 on the recording medium 820.

When a failed ejection nozzle occurs in the nozzle array of the recording head 800, a white stripe occurs in a drawing region corresponding to the position of the failed ejection nozzle. Thus, during failed ejection correction, drawing by the nozzle close to the failed ejection nozzle, i.e. 'failed ejection correction nozzle', is thicken, thereby reducing visibility of the white stripe. Methods of thickening drawing by a failed ejection correction nozzle include various schemes, which are for instance (1) a method of correcting data of an output image, and (2) a method of intensifying an ejection signal to correct the diameter of ejection dot in a stronger manner.

When a 'natural failed ejection nozzle', such as a clogging nozzle or a failed nozzle, causes a failed ejection state, a white strip is formed, which has been described above. Even in the case without failed ejection in actuality, presence of a 'large ejection bending nozzle' with a large 'ejection bending' also causes a white (white and black) stripe. If ejection bending occurs for a certain nozzle, a white background of a sheet appears at an original ejection position, which is unfortunately viewed as white stripe. When such a white stripe due to the large ejection bending nozzle occurs, the large ejection bending nozzle is intentionally failed ejection-processed to perform failed ejection correction, thereby enabling a stable image quality to be achieved.

An example of a technique of failed ejection correction is a technique described in Japanese Patent Application Laid-Open No. 2012-71474. The gist of the technical details described in this document is as follows.

On the basis of an arrangement form of nozzles in a recording head, and correspondence information representing correspondence relationship between multiple types of deposition interference patterns corresponding to deposition interference induction factors including the deposition order of droplet defined in the direction in which the head and a medium subjected to deposition relatively move from each other and each nozzle, correction parameters for failed ejection correction corresponding to the difference in deposition interference patterns is defined and stored in a storage. When an image is output, the correction parameters for failed ejection correction are referred to on the basis of failed ejection nozzle position information, and correction calculation is performed for input image data using corresponding correction parameters, thereby generating image data having been corrected such that nozzles other than a failed ejection nozzle compensate the output of the failed ejection nozzle.

<On Usefulness of Application of this Technique to Failed Ejection Correction Parameters>

As to the failed ejection correction parameters, there is a possibility that the optimal parameter varies according to the ejection state from the nozzle at the failed ejection correction nozzle and neighboring nozzles therearound; meanwhile, the ejection states from the nozzles are not always stable. As with the concentration unevenness correction parameters, it is preferred that the parameters be optimized for the respective nozzles, and that the latest parameters be used as much as possible.

The failed ejection correction parameters depend on the ejection states of the failed ejection correction nozzle and its neighboring nozzles therearound. There is thus a possibility that update of some of old parameters with new parameters causes an unnatural parameter gap at the boundary between updated nozzles and non-updated nozzles. Accordingly, the technique of managing parameters according to the present invention is useful even for failed ejection correction parameters as with concentration unevenness correction parameters.

Second Embodiment

Next, an example of a printing system incorporating a failed ejection correction function is described.

Figure 18:
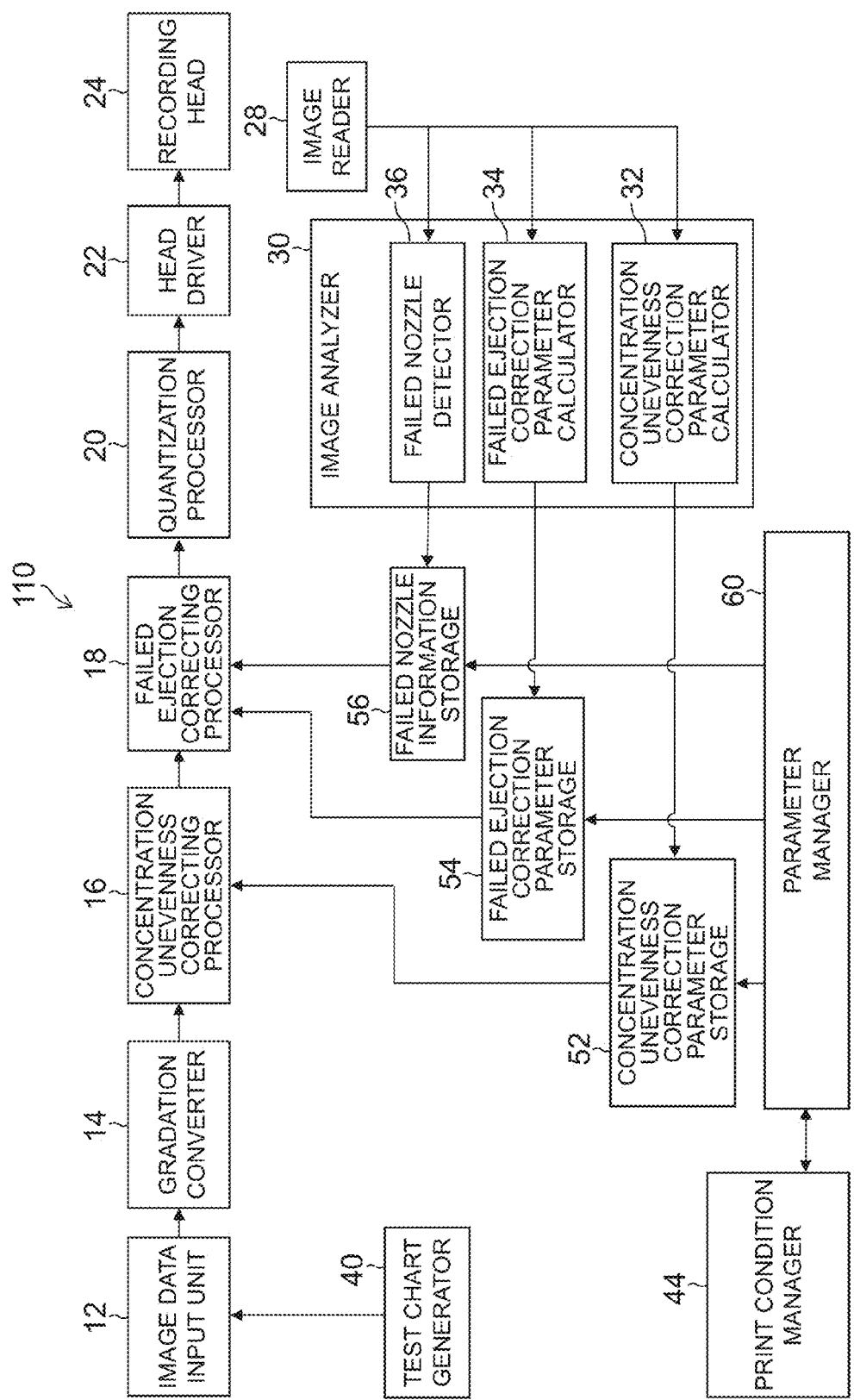
FIG. 18 is a block diagram of main parts of an example of a configuration of a printing system according to a second embodiment.

FIG. 18 is a block diagram of main parts of a printing system according to a second embodiment. In FIG. 18, the same symbols are assigned to elements identical or similar to the configurational elements shown in FIG. 1. The description thereof is omitted. Although not shown in FIG. 18 for the sake of simple illustration, a printing system 110 in FIG. 18 also includes a medium conveyor 26, a controller 62, a display unit 64, and an input device 66, which have been described in FIG. 1.

The printing system 110 shown in FIG. 18 includes a failed ejection correcting processor 18 after a concentration unevenness correcting processor 16. Image data as a print object is subjected to a concentration unevenness correcting process by the concentration unevenness correcting processor 16 and a failed ejection correcting process by the failed ejection correcting processor 18, and then is transmitted to the quantization processor 20. The failed ejection correcting processor 18 applies a failed ejection technique, which causes neighboring nozzles of failed ejection nozzles (including a natural failed ejection nozzle and failed ejection-processed nozzles) to compensate output and reduce visibility of a white stripe.

A test chart generator 40 of the printing system 110 has functions of generating data not only on a test chart for measuring concentration but also on a failed nozzle detecting test chart for detecting a failed nozzle, and a test chart for failed ejection correction for calculating failed ejection correction parameters.

For instance, what is called a "one-on n-off" type test chart can be used as a test chart for detecting a failed nozzle. As to the "one-on n-off" type test chart, in one line head, for an array of nozzles configuring a nozzle array arranged substantially in one line in the x direction, it is assumed that nozzle numbers are sequentially assigned from one end of the array in the main scanning direction; multiple nozzles that simultaneously performing ejection are classified into groups by reminders "B" (B=0, 1, . . . , A−1) acquired by dividing nozzle numbers by integers "A" at least two, deposition timings are set different for the respective nozzle number groups AN+0, AN+1, . . . , AN+B (N is an integer at least 0), and line groups due to sequential ejection from the nozzles are formed respectively.

Use of such a test chart for detecting a failed nozzle forms line patterns (for each nozzle) that do not overlap line patterns of adjacent nozzles and are separated for each nozzle.

From an output result of the test chart for detecting a failed nozzle, presence and absence of ejection (natural failed ejection) from each nozzle can be grasped. A nozzle with a deposition position error exceeding a threshold can be determined as a large ejection bending nozzle by measuring the deposition positions of the respective nozzles.

For instance, a test chart as shown in FIG. 2 in Japanese Patent Application Laid-Open No. 2012-71474 can be used as a test chart for failed ejection correction.

The test chart for failed ejection correction includes a patch where failed ejection correction parameters (correction coefficients) are applied to nozzle positions on both sides adjacent to nozzle (intentionally failed ejection-processed) simulating a presence of a failed ejection nozzle. From a drawing result with varying values of failed ejection correction parameters, the optimal failed ejection correction parameters can be identified. An appropriate correction value (correction coefficient) for failed ejection correction can be determined for each nozzle by creating patches with different positions of nozzles simulating failed ejection. Publicly known techniques can be applied to the technique of detecting a failed nozzle and a technique of failed ejection correction.

The printing system 110 shown in FIG. 18 includes an image analyzer 30 that analyzes read images of various test charts read by the image reader 28. The image analyzer 30 includes a concentration unevenness correction parameter calculator 32, a failed ejection correction parameter calculator 34, and a failed nozzle detector 36.

The failed nozzle detector 36 performs a process of detecting a failed ejection nozzle position on the basis of the read image of the test chart for detecting a failed nozzle. The failed nozzle detector 36 calculates the deposition position error of each nozzle on the basis of the read image of the test chart for detecting a failed nozzle, determines a nozzle having a deposition position error exceeding the threshold as a large ejection bending nozzle, and specifies this nozzle as a failed ejection-processed nozzle which is forcedly failed ejection-processed. Information on the failed nozzle detected by the failed nozzle detector 36 (information for identifying the positions of a failed ejection nozzle and a failed ejection-processed nozzle) is stored in the failed nozzle information storage 56.

The failed ejection correction parameter calculator 34 performs a calculation process of determining image concentration correction values (failed ejection correction parameters) for neighboring nozzles with respect to the failed ejection nozzle position on the basis of the read result of the test chart for failed ejection correction. The failed ejection correction parameter calculator 34 generates a failed ejection correction LUT (corresponding to failed ejection correction parameters) that defines correction values for failed ejection correction for the respective nozzles.

The failed ejection correction parameters generated by the failed ejection correction parameter calculator 34 are stored in the failed ejection correction parameter storage 54.

The parameter manager 60 manages information stored in the failed nozzle information storage 56 and information stored in the failed ejection correction parameter storage 54. The parameter manager 60 cooperates with the print condition manager 44 to control reading of parameters to be passed to the failed ejection correcting processor 18. The failed ejection correcting processor 18 performs a failed ejection correcting process for correcting image data using the provided failed nozzle information and failed ejection correction parameters.

The parameter manager 60 performs parameter management also for failed ejection correction parameters as with for the concentration unevenness correction parameters, thereby achieving the foregoing [Rule].

In this embodiment, the test chart for detecting a failed nozzle is recorded on a margin of a recording medium on a sheet-by-sheet basis during printing. The chart is read by the image reader 28, occurrence of a failed nozzle is detected in an early stage, and the failed ejection correcting process according to the failed ejection process is applied.

<On Integration of Correction Parameters Created Using Recording Media with Different Medium Sizes>

There can be a concept where, in the case of creating a correction parameter LUT_k using a recording medium with a specific medium size ($S_k$) and subsequently creating a correction parameter LUT_v using a recording medium with a medium size $S_v$ smaller than $S_k$, a part of LUT_k (a range corresponding to the medium size $S_v$) is updated by being replaced with the latest LUT_v.

However, in such a case, there is a possibility that adverse effects (flare) of light from the margin during reading of the test chart or the like cause an unnatural parameter gap at the boundary (joint) between updated nozzles and non-updated nozzles, as described above. For the sake of improvement through addressing such a parameter gap, it is preferred to perform a process of adjusting correction parameters by applying any process, such as a smoothing process, for alleviating discontinuity to the joint portion.

<On Program Causing Computer to Operate>

A program for achieving the content of parameter management described in this embodiment can be recorded in a CD-ROM, a magnetic disk and other computer-readable media (a non-transitory information storage medium as a corporeal thing), and the program can be provided for a third party through the information storage medium. Instead of such an embodiment that stores the program in the information storage medium for providing the program, a program signal can be provided as a download service using a communication network, such as the Internet. Alternatively, functions achieved by this program can be provided as ASP (application service provider) services. In an embodiment, a part of or the entire program for achieving the details of print control including the parameter management functions described in this embodiment can be implemented in a superior control apparatus, such as a host computer, or adopted as an operation program for a central processing unit (CPU) in a printer.

<Configurational Example of Inkjet Recording Apparatus>

Next, a configurational example of an inkjet recording apparatus adoptable as the printing systems 10 and 110 is described.

Figure 19:
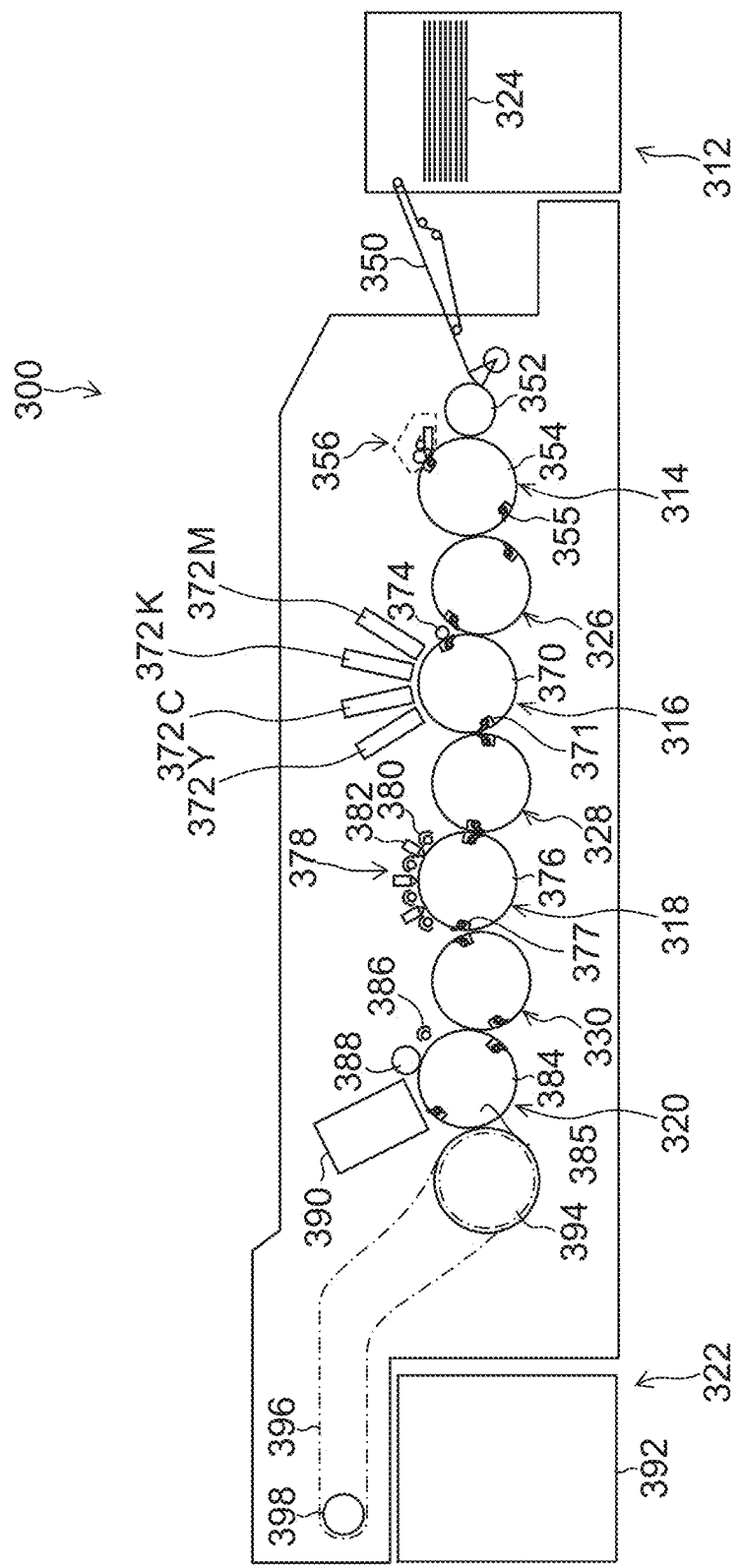
FIG. 19 is a diagram of the entire configuration of an inkjet recording apparatus.

FIG. 19 is a diagram showing a configurational example of an inkjet recording apparatus 300. The inkjet recording apparatus 300 is a direct-drawing inkjet recording apparatus that ejects multiple color inks from inkjet heads 372M, 372K, 372C and 372Y onto a recording medium 324 (hereinafter, may be referred to as a "sheet") held by a drawing drum 370 to form a desired color image. This apparatus is a drop-on-demand type image forming apparatus to which two-liquid reaction (coagulation) method is applied. This method applies process liquid (here, coagulation process liquid) on the recording medium 324 before ink deposition, and reacts the process liquid and ink liquid to form an image on the recording medium 324.

As illustrated, the inkjet recording apparatus 300 mainly includes a sheet feeder 312, a process liquid applier 314, a drawing unit 316, a drier 318, a fixing unit 320, and a sheet ejector 322. The inkjet heads 372M, 372K, 372C and 372Y of the drawing unit 316 correspond to the "recording head 24" described in FIG. 1. A sheet conveyance system including the drawing drum 370 corresponds to the "medium conveyor 26".

(Sheet Feeder)

Recording media 324, which are paper sheets, are stacked on the sheet feeder 312. The recording media 324 are supplied from a sheet feeding tray 350 of the sheet feeder 312 to the process liquid applier 314 on a sheet-by-sheet basis. The paper sheets (cut sheets) are thus adopted as recording media 324. However, a configuration may also be adopted that cuts continuous roll of paper (roll paper) into a sheet having a required size and supplies the sheet.

(Process Liquid Applier)

The process liquid applier 314 is a mechanism of applying process liquid to a recording surface of the recording medium 324. The process liquid contains color material coagulant that coagulates color materials (pigments in this example) in the ink applied in the drawing unit 316. Contact between the process liquid and the ink promotes separation of the color materials from solvent of the ink.

The process liquid applier 314 includes a sheet feed drum 352, a process liquid drum 354, and a process liquid application device 356. The process liquid drum 354 includes a nail-shaped holding device (gripper) 355 on the outer peripheral surface. The distal end of the recording medium 324 can be held by sandwiching the recording medium 324 between the nail of the holding device 355 and the peripheral surface of the process liquid drum 354. Alternatively, suction holes may be provided on the external peripheral surface of the process liquid drum 354, and a suction device may communicate with the suction hole for sucking.

The process liquid application device 356 may adopt not only an application method through a roller but also various methods, such as a spray method, and an inkjet method.

The recording medium 324 to which process liquid has been applied is passed from the process liquid drum 354 through an intermediate conveyor 326 to the drawing drum 370 of the drawing unit 316.

(Drawing Unit)

The drawing unit 316 includes the drawing drum 370, a sheet pressing roller 374, and the inkjet heads 372M, 372K, 372C and 372Y. As with the process liquid drum 354, the drawing drum 370 includes a nail-shaped holding device (gripper) 371 at the external peripheral surface.

Each of the inkjet heads 372M, 372K, 372C and 372Y is a recording head that is for a full line type inkjet system and has a length supporting the maximum width of the image formation region of the recording medium 324. A nozzle array is formed on the ink ejection surface of the head. In this array, multiple nozzles for ejecting ink are arranged along the entire width of the image formation region. Each of the inkjet heads 372M, 372K, 372C and 372Y is arranged so as to extend in a direction orthogonal to the conveyance direction of the recording medium 324 (the rotational direction of the drawing drum 370).

While the recording medium 324 is conveyed by the drawing drum 370 at a constant speed, only one operation of relatively moving the recording medium 324 and each of the inkjet heads 372M, 372K, 372C and 372Y from each other is performed in the conveyance direction (i.e., one sub-scanning), thereby allowing an image to be recorded on the image formation region on the recording medium 324.

Here, the inkjet recording apparatus 310 using inks of four colors, CMYK, is exemplified. However, the combination of color inks and the number of colors are not limited to the implementation of this embodiment. Alternatively, light color inks, strong color inks or special color inks may be added if necessary. For instance, a configuration may be adopted that additionally includes an inkjet head for ejecting inks of light colors, such as of light cyan and light magenta. Furthermore, the arrangement order of the heads for the colors is not specifically limited.

The recording medium 324 on which the image has been formed by the drawing unit 316 is passed from the drawing drum 370 through the intermediate conveyor 328 to a drying drum 376 of the drier 318.

(Drier)

The drier 318 is a mechanism for drying moisture included in solvent separated through color material coagulating effects, and includes the drying drum 376, and the solvent dryer 378. As with the process liquid drum 354, the drying drum 376 includes a nail-shaped holding device (gripper) 377 on the external peripheral surface. The solvent dryer 378 includes multiple halogen heaters 380, and hot air jetting nozzles 382. The recording medium 324 having been subjected to a drying process by the drier 318 is passed from the drying drum 376 through the intermediate conveyor 330 to the fixing drum 384 of the fixing unit 320.

(Fixing Unit)

The fixing unit 320 includes the fixing drum 384, a halogen heater 386, a fixation roller 388, and an in-line sensor 390 (corresponding to a "reading device"). As with the process liquid drum 354, the fixing drum 384 includes a nail-shaped holding device (gripper) 385 on the external peripheral surface.

The in-line sensor 390 is a device that reads the image formed on the recording medium 324 (including the test chart for measuring concentration and the test chart for detecting a failed nozzle, and the test chart for failed ejection correction and the like) and detects the concentration of the image, failure in the image and the like. This sensor may be a CCD line sensor or the like. The in-line sensor 390 corresponds to the "image reader 28" described with reference to FIG. 1.

(Sheet Ejector)

The sheet ejector 322 includes a sheet ejection tray 392. A transfer drum 394, a conveyance belt 396, and a tension roller 398 are provided between the sheet ejection tray 392 and the fixing drum 384 of the fixing unit 320 so as to be opposite thereto. The recording medium 324 is conveyed to the conveyance belt 396 by the transfer drum 394, and ejected onto the sheet ejection tray 392. The details of a sheet conveyance mechanism by the conveyance belt 396 are not illustrated. However, the recording medium 324 after printing is held at the distal end of the sheet by a gripper of a bar (not shown) arranged across the endless conveyance belt 396, and conveyed above the sheet ejection tray 392 by rotation of the conveyance belt 396.

Although not shown in FIG. 19, the inkjet recording apparatus 300 in this example includes an ink reserving and charging unit that supplies inks to the respective inkjet heads 372M, 372K, 372C and 372Y, and a device that supplies process liquid to the process liquid applier 314. This apparatus further includes a head maintenance unit that cleans the inkjet heads 372M, 372K, 372C and 372Y (wiping and purging nozzle surfaces and nozzle suction, etc.), position detection sensors that detect the position of the recording medium 324 on the sheet conveyance path, and temperature sensors that detect the temperatures of each element of the apparatus.

<Structure of Inkjet Head>

Next, the structures of the inkjet heads are described. The structures of the respective inkjet heads 372M, 372K, 372C and 372Y are common to each other. Accordingly, a symbol 450 indicates a head as a representative of these heads.

Figure 20A:
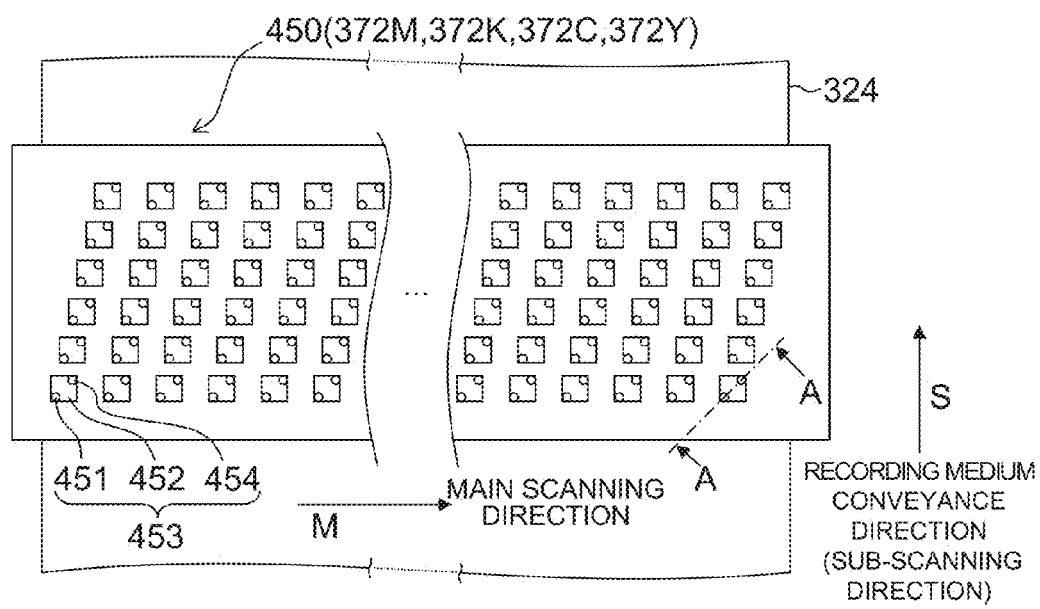
FIG. 20A is a perspective plan view of an example of a structure of a head.
Figure 20B:
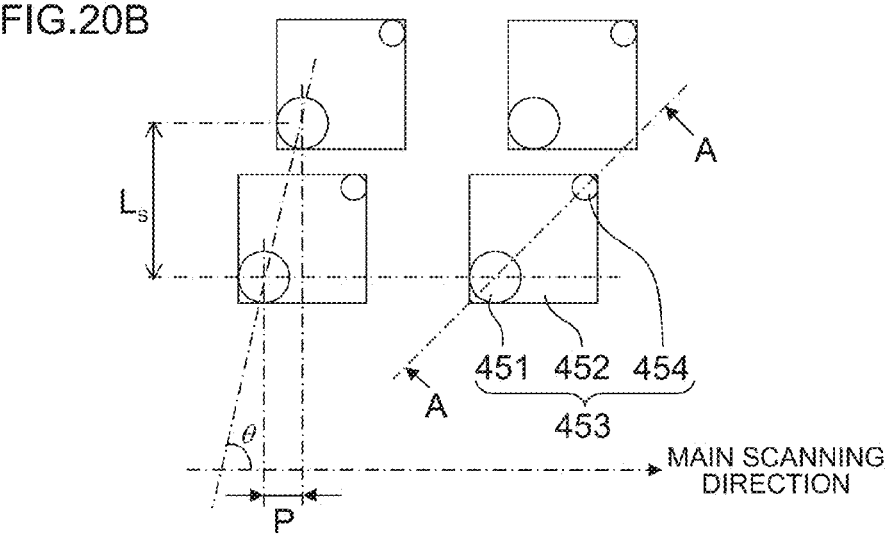
FIG. 20B is an enlarged view of a part thereof.
Figure 21A:
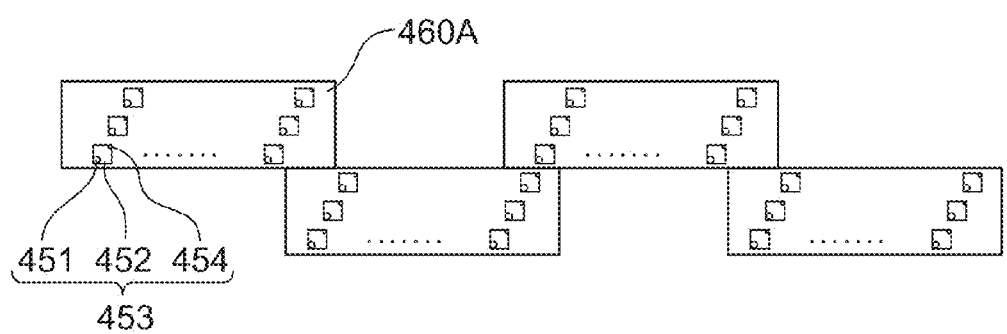
FIG. 21A is a perspective plan view showing an example of another structure of a head.
Figure 21B:
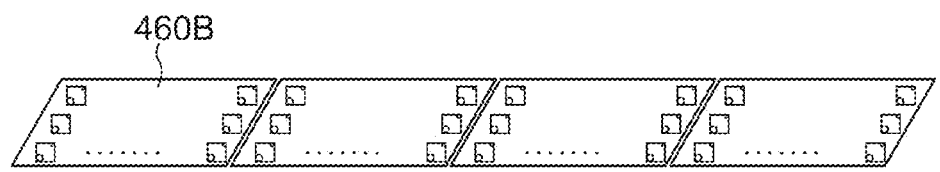
FIG. 21B is an another perspective plan view showing an example of another structure of a head.
Figure 22:
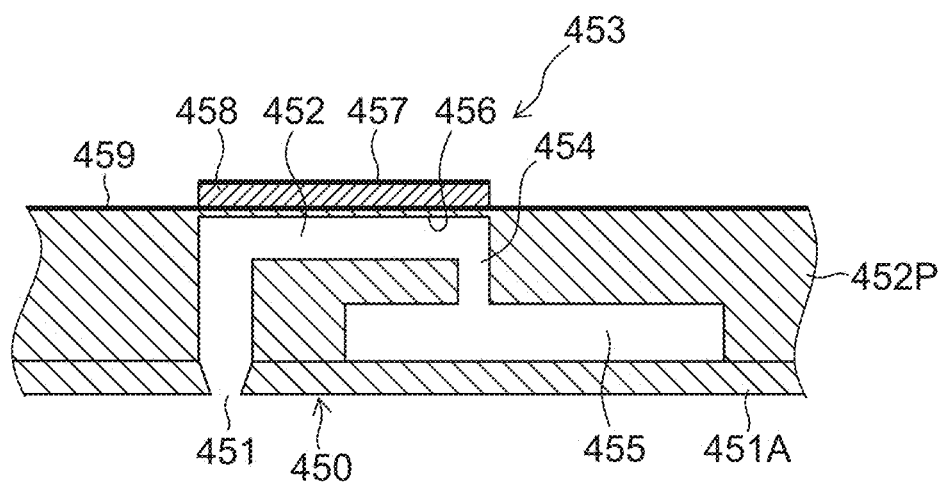
FIG. 22 is a sectional view taken along line A-A of FIG. 20A.

FIG. 20A is a perspective plan view showing an example of the structure of the head 450. FIG. 20B is an enlarged view of a part of the structure. FIGS. 21A, 21B are perspective plan views showing an example of another structure of a head 450. FIG. 22 is a sectional view (a sectional view taken along line A-A of FIGS. 20A, 20B) showing a stereoscopic configuration of a droplet ejecting element for one channel, which is a unit of a recording element (an ink chamber unit corresponding to one nozzle 451).

As shown in FIG. 20A, the head 450 of this example has a structure where multiple ink chamber units (droplet ejecting elements) 453, which each include a nozzle 451 as an ink ejection port, and a pressure chamber 452 corresponding to the nozzle 451 and the like, are arranged two-dimensionally into a matrix. This structure achieves a high density of the substantial nozzle intervals (projected nozzle pitches) projected (orthogonally projected) so as to be arranged in the head longitudinal direction (a direction orthogonal to the sheet conveyance direction).

An embodiment where a nozzle array having at least a length corresponding to the entire width of the drawing region of the recording medium 324 in a direction (the direction of an arrow M; main scanning direction) substantially orthogonal to the conveyance direction of the recording medium 324 (the direction of an arrow S; sub-scanning direction) is not limited to this example. For instance, instead of the configuration in FIG. 20A, a configuration as shown in FIG. 21A may be adopted where short head modules 460A including two-dimensionally arranged multiple nozzles 451 are arranged in a staggered manner and combined to configure a line head including a nozzle array with a length supporting the entire width of the recording medium 324, and a configuration as shown in FIG. 21B may be adopted where head modules 460B are arranged in one line and combined.

The pressure chamber 452 provided corresponding to each nozzle 451 has a substantially square planar shape (see FIGS. 20A and 20B). An outlet to the nozzle 451 is provided at one end of the opposite corners on a diagonal line, and an inlet port (supply port) 454 for supply ink provided at the other end. The shape of the pressure chamber 452 is not limited to this example. Alternatively, various shapes may be adopted that have planar shapes of a quadrilateral (rhombus, rectangle, etc.), a pentagon, a hexagon, other polygons, a circle, an ellipse and the like.

As shown in FIG. 22, the head 450 has a structure where a nozzle plate 451A having a nozzle 451 formed therein, a channel plate 452P having flow paths including a pressure chamber 452 and a common channel 455 and the like formed therein and the like are stacked and joined.

The channel plate 452P is a flow path formation member that forms a side wall of the pressure chamber 452, and the supply port 454 as a narrowed part (narrowest part) of an individual supply path for supplying ink from the common channel 455 to the pressure chamber 452. For the sake of description, FIG. 24 shows a schematic view. In actuality, the channel plate 452P has a one substrates structure or a structure where multiple substrates are stacked.

The nozzle plate 451A and the channel plate 452P can be made of a material of silicon, and fabricated into a desired shape through a semiconductor manufacturing process.

The common channel 455 communicates with an ink tank (not shown), which is an ink supply source. Ink supplied from the ink tank is supplied through the common channel 455 to each pressure chamber 452.

A piezoelectric actuator 458 including an individual electrode 457 is connected to a diaphragm 456 configuring a part of a surface (a ceiling surface in FIG. 22) of the pressure chamber 452. The diaphragm 456 of this example functions as a common electrode 459 corresponding to a lower electrode of the piezoelectric actuator 458. An embodiment may be adopted where a diaphragm is made of a non-conductive material, such as silicon or a resin. In this case, a common electrode layer made of a conductive material, such as a metal, is formed on the surface of a member of the diaphragm.

Application of drive voltage to the individual electrode 457 deforms the piezoelectric actuator 458 to change the capacity of the pressure chamber 452. Resultant change in pressure ejects ink from the nozzle 451.

As shown in FIG. 20B, many ink chamber units 453 having such a structure are arranged in a lattice at a constant pattern along a row direction along the main scanning direction and an oblique column direction at a constant angle θ where the direction is not orthogonal to the main scanning direction. This arrangement thus achieves the high density nozzle head of this example. In such a matrix arrangement, provided that an adjacent nozzle interval is Ls in the sub-scanning direction, the main scanning direction can be equivalently treated such that the nozzles 451 are linearly arranged at a constant pitch P=Ls/tan θ.

The arrangement form of the nozzles 451 is not limited to the illustrated example. Alternatively, various nozzle arrangement structures may be applied. For instance, a linear arrangement on one line, a V-shaped nozzle arrangement, and a polygonally linear nozzle arrangements such as a zigzag (e.g., W-shape) pattern with repetition units of V-shaped arrangements may be adopted.

<Description on Control System>

Figure 23:
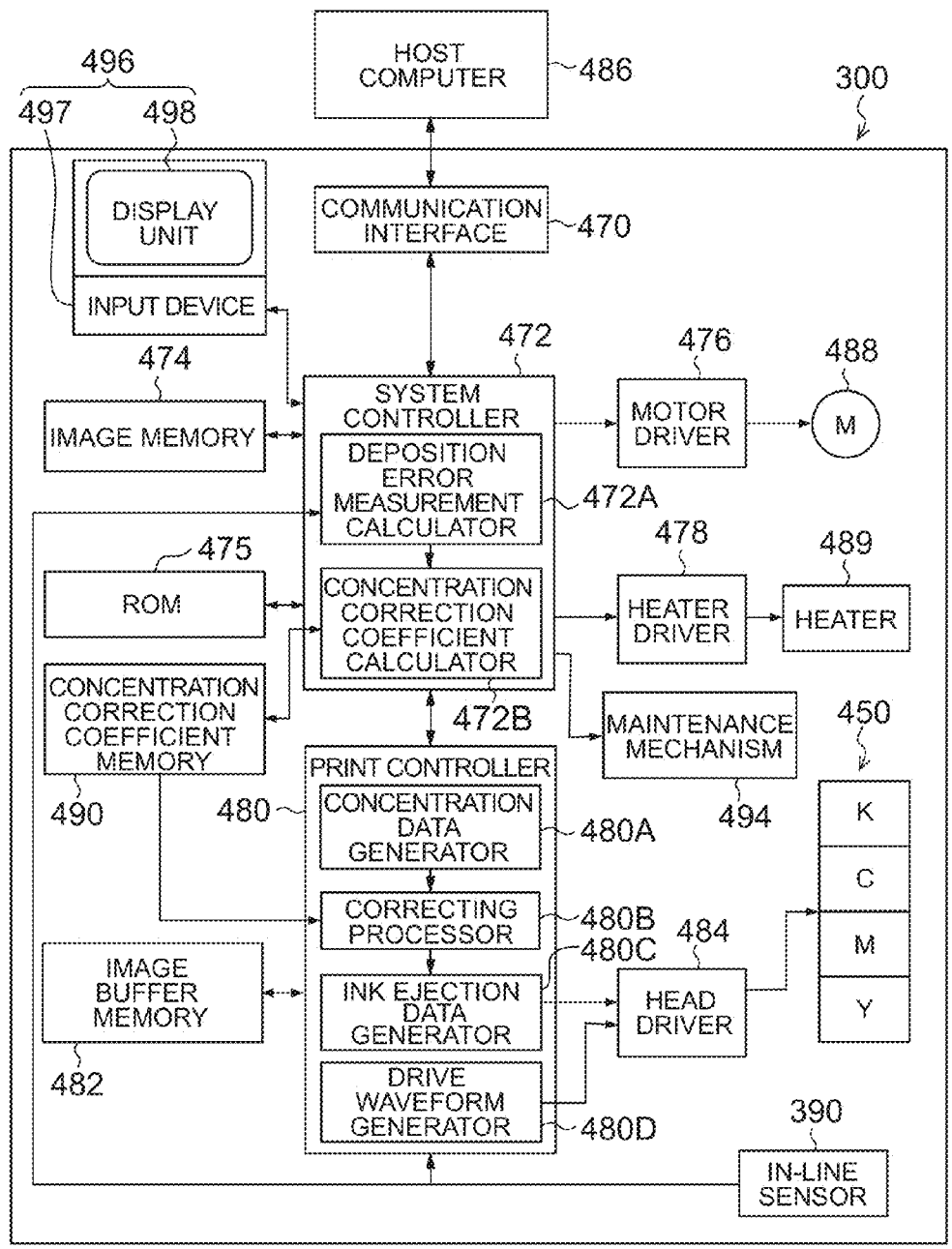
FIG. 23 is a block diagram showing a configuration of a control system of the inkjet recording apparatus.

FIG. 23 is a block diagram showing a system configuration of the inkjet recording apparatus 300. As shown in FIG. 23, the inkjet recording apparatus 300 includes a communication interface 470, a system controller 472, an image memory 474, a ROM 475, a motor driver 476, a heater driver 478, a print controller 480, an image buffer memory 482, a head driver 484 and the like.

The communication interface 470 is an interface that receives image data transmitted from the host computer 486. The communication interface 470 may be serial interface, such as a USB (universal serial bus), IEEE 1394, Ethernet (registered trademark) or a wireless network, or a parallel interface, such as Centronics. A buffer memory (not shown) for increasing the communication speed may be mounted at this part. The communication interface 470 can function as an image data input unit 12 described in FIG. 1.

The image memory 474 is a storing device that stores an image input through the communication interface 470. Through the system controller 472, data is read and written. The image memory 474 is not limited to a memory made of semiconductor elements. Alternatively, this memory may be a magnetic medium, such as a hard disk.

The system controller 472 includes a central processing unit (CPU) peripheral circuits therearound and the like, and functions as a control device that controls the entire inkjet recording apparatus 300 according to a prescribed program and further functions as a calculation device that perform various calculations. That is, the system controller 472 controls each of elements, such as the communication interface 470, the image memory 474, the motor driver 476, the heater driver 478 and the like, performs communication control with the host computer 486, performs reading and writing control for the image memory 474 and the ROM 475, and the like, and generates control signals for controlling a conveyance system motor 488 and a heater 489.

The system controller 472 includes a deposition error measurement calculator 472A that performs a calculation process of generating the failed ejection nozzle position, data on the deposition position error, data representing the concentration distribution (concentration data) and the like on the basis of read image data read from the in-line sensor 390, and a concentration correction coefficient calculator 472B that calculates the concentration correction coefficient on the basis of information on the measured deposition position error and concentration information. The processing functions of the deposition error measurement calculator 472A and the concentration correction coefficient calculator 472B can be achieved by an ASIC and software or an appropriate combination. Data on the concentration correction coefficient calculated by the concentration correction coefficient calculator 472B is stored in the concentration correction coefficient memory 490.

The system controller 472 functions as the test chart generator 40, the print condition manager 44, the parameter manager 60, the controller 62, and the image analyzer 30, which have been described with reference to FIGS. 1 and 18. The concentration correction coefficient memory 490 in FIG. 23 corresponds to the concentration unevenness correction parameter storage 52, which has been described with reference to FIGS. 1 and 18.

The ROM 475 stores a program to be executed by the CPU of the system controller 472, and various pieces of data (including the test chart for measuring concentration, data for ejecting a test chart for detecting the failed ejection nozzle position, failed ejection nozzle information, and the like) required for control. The ROM 475 may be a non-rewritable storing device or a rewritable storing device. A configuration may be adopted where the ROM 475 serves as the concentration correction coefficient memory 490 in a shared manner utilizing the storage region of the ROM 475.

The image memory 474 is used as a temporary storage region for image data, and also used as a program deployment region and a calculation work region for CPU.

The motor driver 476 is a driver (drive circuit) that drives the conveyance system motor 488 according to an instruction from the system controller 472. The heater driver 478 is a driver that drives the heater 489 in the drier 318 and the like according to an instruction from the system controller 472.

The print controller 480 functions as a signal processing device that performs processes including various types of processing and correction for generating signals for controlling ejection on the basis of the image data (multiple-value input image data) in the image memory 474 according to control by the system controller 472, and also functions as a drive control device that supplies the generated ink ejection data to the head driver 484 to control ejection driving of the head 450.

That is, the print controller 480 includes a concentration data generator 480A, a correcting processor 480B, an ink ejection data generator 480C, and a drive waveform generator 480D. These functional blocks (480A to 480D) can be achieved by an ASIC and software or an appropriate combination.

The concentration data generator 480A is a signal processing device that generates initial concentration data for each ink color from the input image data, and performs concentration conversion process (including a UCR process and color conversion), and performs a process of converting the number of pixels, if necessary.

The correcting processor 480B is a processing device that performs concentration correction calculation using the concentration correction coefficient stored in the concentration correction coefficient memory 490, and performs an unevenness correcting process.

The ink ejection data generator 480C is a signal processing device including a halftoning processing device that converts the image data (concentration data), having corrected and generated by the correcting processor 480B, into binary or multiple-value dot data, and performs a quantization process.

The ink ejection data generated by the ink ejection data generator 480C is supplied to the head driver 484, and the ink ejection operation by the head 450 is controlled.

The print controller 480 functions as the gradation converter 14, the concentration unevenness correcting processor 16, the failed ejection correcting processor 18, and the quantization processor 20, which have been described with reference to FIGS. 1 and 18. The head driver 484 corresponds to the head driver 22 in FIGS. 1 and 18.

The drive waveform generator 480D is a device that generates a drive signal waveform for driving the piezoelectric actuator 458 (see FIG. 22) corresponding to each nozzle 451 in the head 450. The signal (drive waveform) generated by the drive waveform generator 480D is supplied to the head driver 484. The signal output from the drive waveform generator 480D may be a digital waveform data or an analog voltage signal.

The inkjet recording apparatus 300 in this example adopts a drive method that applies a common drive power waveform signal to each piezoelectric actuator 458 of the head 450 to turn on and off of a switch element (not shown) connected to the individual electrode of each piezoelectric actuator 458 in response to the ejection timing of each nozzle 451, thereby causing ink to be ejected from the nozzle 451 corresponding to the piezoelectric actuator 458 concerned.

The print controller 480 includes an image buffer memory 482. Data, such as image data and parameters, is temporarily stored in the image buffer memory 482 during image data processing in the print controller 480. FIG. 23 shows the image buffer memory 482 as the implementation accompanying the print controller 480. Alternatively, the image memory 474 may also serve as this memory. An embodiment having a configuration including one processor into which the print controller 480 and the system controller 472 are integrated can also be adopted.

The head driver 484 (corresponding to symbol 22 in FIG. 1) includes an amplifier circuit, and outputs a drive signal for driving the piezoelectric actuator 458 corresponding to each nozzle 451 in the head 450 according to the print content on the basis of the ink ejection data supplied from the print controller 480 and the drive waveform signal. The head driver 484 may include a feedback control system for maintaining head driving conditions constant.

The print controller 480 performs various corrections for the head 450 on the basis of information acquired from the in-line sensor 390, and performs control for executing preliminary ejection, sucking and a cleaning operation (nozzle recovery operations), such as wiping, if necessary.

A maintenance mechanism 494 in the diagram includes elements required for head maintenance, such as an ink pan, a suction cap, a suction pump, and a wiper blade.

An operation unit 496, which is a user interface, includes an input device 497, and a display unit (display) 498. The input device 497 and the display unit 498 corresponds to the input device 66 and the display unit 64, respectively, which have been described with reference to FIG. 1.

An embodiment can also be adopted that the host computer 486 incorporates all or some of the processing functions served by the deposition error measurement calculator 472A, the concentration correction coefficient calculator 472B, the concentration data generator 480A, and the correcting processor 480B, which have been described with reference to FIG. 23. Alternatively, a configuration can be adopted where all or some of the functions of the system controller 472 are served by the host computer 486.

<On Device that Relatively Moves Head and Sheet>

In the foregoing embodiment, the configuration of conveying the recording medium with respect to the immobile head has been exemplified. For implementing the present invention, a configuration can also be adopted where a head is moved with respect to an immobile recording medium (medium for drawing).

<On Ejecting Method>

The device that generates pressure (ejection energy) for ejecting droplets from each nozzle in the inkjet head is not limited to piezo-actuator (piezoelectric element). In addition to the piezoelectric element, various pressure generation elements (ejection energy generation elements) are adoptable including an electrostatic actuator, a heater (heating element) in a thermal system (a system heater that causes ink to be ejected using a pressure of film boiling due to heating), and various actuators according to other system. In conformity with the ejection system of the head, corresponding energy generation elements are provided in a flow path structure.

<On Recording Media>

"Recording media" include what are called various terms including printing media, media to be recorded, media to be image-formed, media to be subjected to image formation, and media subjected to deposition. For implementing the present invention, the material shape and the like of the recording medium are not specifically limited. Various sheets are usable including a continuous roll of paper, a cut sheet, a label sheet, a resin sheet (e.g., an OHP sheet), film, cloth, nonwoven fabric, a printed circuit board on which wiring patterns and the like are formed, a rubber sheet, and other various sheets irrespective of the material or shape.

<Application Example of Apparatus>

In the foregoing embodiment, the example of the application to the inkjet recording apparatus for color printing has been described. However, application ranges of the present invention are not limited to this example. Instead, the present invention is applicable to various image recording apparatuses that use image processing parameters according to the recording positions of an image.

<On Image Recorder Other than Inkjet System Recorder>

The foregoing description has exemplified the inkjet system image recorder. However, the application range of the present invention is not limited thereto. In configurations other than of the inkjet system, the present invention is applicable to image recording apparatuses according to various systems of dot recording, such as a thermal transfer recording apparatus including a recording head where a thermal element is adopted as a recording element, an LED electronic photographic printer including a recording head where LED elements are recording elements, a silver halide film system printer that includes an LED line exposure head, and the like.

As the image recording apparatus, various type printers are adoptable including not only a digital printer, such as an inkjet printer, but also an offset printer, and an electronic photographic printer.

Configurational elements can be appropriately changed in, added to, and deleted from the aforementioned embodiments of the present invention in a range without departing from the spirit of the present invention. The present invention is not limited to the aforementioned embodiments. Instead, those ordinarily skilled in the art can make various modifications within the technical thought of the present invention.

What is claimed is:

1. An image recording method of causing an image recorder to record an image on a recording medium on the basis of image data, comprising:
    associating information identifying an image recording range by the image recorder, the image recording range being in a first direction and corresponding to a medium size of recording media used for outputting test charts, with image processing parameters which are according to positions in the first direction and have been generated on the basis of output results of the test charts;
    managing the associated information and the image processing parameters;
    when recording the image in a condition where the image recording range in the first direction by the image recorder is a specific range,
    applying image processing to the image data using an image processing parameter among the managed image processing parameters, the image processing parameter being a latest image processing parameter among image processing parameters which have been generated on the basis of measurement results of test charts output using the specific range or a wider range than the specific range on the image recorder; and
    causing the image recorder to record the image on the recording medium according to the image data after the image processing.

2. The image recording method according to claim 1, further comprising: when generating the latest image processing parameter, specifying an image processing parameter generated on the basis of a measurement result of a test chart output using a narrower range than the specific range before a timing of generating the latest image processing parameter, not to be used, after the timing of generating the latest image processing parameter.

3. The image recording method according to claim 1, further comprising:
    when recording the image using the specific range of the image recorder on a recording medium with a medium size in the first direction which is a specific size,
    applying image processing on the image data using the latest image processing parameter among image processing parameters which are according to positions in the first direction and have been generated on the basis of measurement results of test charts recorded on recording media having a size identical to the specific size or a larger size than the specific size; and
    recording the image on the recording medium with the specific size according to the image data after the image processing.

4. The image recording method according to claim 3, further comprising: when generating the latest image processing parameter, specifying an image processing parameter generated on the basis of a measurement result of a test chart recorded on a recording medium with a smaller size than the specific size before a timing of generating the latest image processing parameter, not to be used, after the timing of generating the latest image processing parameter.

5. The image recording method according to claim 1, further comprising managing the image processing parameter for each of print conditions different in at least one print condition of a medium type, an ink type, and a quantization method.

6. The image recording method according to claim 1,
    wherein the image recorder is a recording head which includes a recording element array including a plurality of recording elements arranged at different positions in the first direction, and
    the image is recorded on the recording medium by controlling an operation of the recording element according to the image data after the image processing, and conveying the recording medium in a second direction orthogonal to the first direction with respect to the recording head.

7. An image recording apparatus, comprising:
    an image recorder which records an image on a recording medium on the basis of image data;
    an image processing parameter storage which stores an image processing parameter according to a position in a first direction for the image recorder;
    a parameter manager which manages storing of the image processing parameter into the image processing parameter storage, and reading of the image processing parameter from the image processing parameter storage, associates information identifying an image recording range by the image recorder, the image recording range being in the first direction and corresponding to a medium size of recording media used for outputting test charts, with image processing parameters which are according to positions in the first direction and have been generated on the basis of output results of the test charts, and manages the associated information and the image processing parameters;

an image processor which performs image processing on the image data using the image processing parameter; and a controller which, when the image is recorded in a condition where the image recording range in the first direction by the image recorder is a specific range, performs image processing for the image data using an image processing parameter among the managed image processing parameters, the image processing parameter being a latest image processing parameter among image processing parameters which have been generated on the basis of output results of test charts recorded using the specific range or a wider range than the specific range of the image recorder, and causes the image recorder to record the image on the recording medium according to processed image data acquired by the image processing using the specific range of the image recorder.

8. The image recording apparatus according to claim 7, wherein the parameter manager further associates updated date and time of the image processing parameter with the image processing parameters, and manages the image processing parameters with the associated updated date and time.

9. The image recording apparatus according to claim 7, wherein when generating the latest image processing parameter, the parameter manager specifies an image processing parameter generated on the basis of a measurement result of a test chart output using a narrower range than the specific range before a timing of generating the latest image processing parameter, not to be used, after the timing of generating the latest image processing parameter.

10. The image recording apparatus according to claim 7, wherein the image processing parameter is stored in the image processing parameter storage in association with at least one combination of print conditions of a medium type, an ink type, and a quantization method.

11. The image recording apparatus according to claim 7, wherein the image recorder is a recording head which includes a recording element array including a plurality of recording elements arranged on different positions in the first direction, and the image is recorded on the recording medium by controlling an operation of the recording element according to image data after the image processing and conveying the recording medium in a second direction orthogonal to the first direction with respect to the recording head.

12. A non-transitory recording medium in which computer-readable code of a program is stored, wherein the program is a program causing a computer to achieve a function of controlling an image recording apparatus of causing an image recorder to record an image on a recording medium on the basis of image data, and the program causes the computer to achieve a function of associating information identifying an image recording range by the image recorder, the image recording range being in a first direction and corresponding to a medium size of recording media used for outputting test charts, with image processing parameters which are according to positions in the first direction and have been generated on the basis of output results of the test charts, and managing the associated information and the image processing parameters, and wherein when recording the image in a condition where the image recording range in the first direction by the image recorder is a specific range, the program causes the computer to achieve an image processing function of applying image processing to the image data using an image processing parameter among the managed image processing parameters, the image processing parameter being a latest image processing parameter among image processing parameters which have been generated on the basis of measurement results of test charts output using the specific range or a wider range than the specific range on the image recorder, and a control function of causing the image recorder to record the image on the recording medium according to the image data after application of the image processing.

* * * * *